US012654683B2

(12) United States Patent (10) Patent No.: US 12,654,683 B2
Maeda et al. (45) Date of Patent: Jun. 16, 2026

(54) VEHICLE INTEGRATED CONTROL DEVICE AND VEHICLE INTEGRATED CONTROL METHOD

(71) Applicant: Hitachi Astemo, Ltd., Hitachinaka (JP)

(72) Inventors: Kenta Maeda, Tokyo (JP); Takahiro Ito, Tokyo (JP); Kentarou Ueno, Hitachinaka (JP); Shuji Ohshita, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/832,879

(22) PCT Filed: Oct. 25, 2022

(86) PCT No.: PCT/JP2022/039706
§ 371 (c)(1),
(2) Date: Jul. 24, 2024

(87) PCT Pub. No.: WO2023/145170
PCT Pub. Date: Aug. 3, 2023

(65) Prior Publication Data
US 2025/0108788 A1 Apr. 3, 2025

(30) Foreign Application Priority Data
Jan. 26, 2022 (JP) ................................. 2022-009971

(51) Int. Cl.
*B60W 30/02* (2012.01)
*B60W 40/08* (2012.01)
*B60W 50/00* (2006.01)
(52) U.S. Cl.
CPC .......... *B60W 30/025* (2013.01); *B60W 40/08* (2013.01); *B60W 50/0097* (2013.01);
(Continued)

(58) Field of Classification Search
CPC ............... B60W 30/025; B60W 40/08; B60W 50/0097; B60W 2540/223;
(Continued)

(56) References Cited

U.S. PATENT DOCUMENTS

2018/0178808 A1* 6/2018 Zhao ........................ B60N 2/20
2019/0022347 A1* 1/2019 Wan ........................ A61B 5/18
(Continued)

FOREIGN PATENT DOCUMENTS

CN 113104048 A 7/2021
DE 10 2017 208 283 A1 5/2018
(Continued)

OTHER PUBLICATIONS

International Search Report Issued in PCT Application No. PCT/JP2022/039706 dated Jan. 17, 2023, with English Translation.
(Continued)

*Primary Examiner* — George C Jin
(74) *Attorney, Agent, or Firm* — Foley & Lardner LLP

(57) ABSTRACT

Provided is a vehicle integrated control device capable of controlling a posture of a vehicle so as to prevent in advance an occupant who has high sensitivity to motion sickness from suffering from the motion sickness. The vehicle integrated control device includes a target value generation unit that generates or acquires a control target value of a movement of a vehicle; a motion sickness sensitivity acquisition unit that acquires a motion sickness sensitivity index that is a quantitative value that is likeliness of incidence of motion sickness that differs depending on an occupant characteristic with respect to at least one occupant riding on the vehicle; and a target value correction unit that corrects the control target value based on the control target value and the motion sickness sensitivity index.

13 Claims, 20 Drawing Sheets

(52) U.S. Cl.
   CPC . *B60W 2540/223* (2020.02); *B60W 2540/225*
         (2020.02); *B60W 2540/227* (2020.02); *B60W*
                                        *2556/10* (2020.02)

(58) Field of Classification Search
   CPC ..... B60W 2540/225; B60W 2540/227; B60W
              2540/049; B60W 2540/221; B60W
                                       60/0013
   See application file for complete search history.

(56)                References Cited

U.S. PATENT DOCUMENTS

| | | | | |
|---|---|---|---|---|
| 2019/0269321 | A1* | 9/2019 | Murakami ............ | A61M 21/00 |
| 2020/0353934 | A1* | 11/2020 | Vulcu .................. | B60N 2/0277 |
| 2020/0385053 | A1* | 12/2020 | Mine ...................... | B62D 6/002 |
| 2021/0237747 | A1* | 8/2021 | Schmidt ............ | B60W 50/0098 |
| 2022/0135054 | A1 | 5/2022 | Nakamura et al. | |
| 2023/0143296 | A1* | 5/2023 | Giovanardi ........... | B60W 40/08 |
| | | | | 701/37 |
| 2025/0162572 | A1* | 5/2025 | Maeda ................... | G06V 20/59 |

FOREIGN PATENT DOCUMENTS

| | | | |
|---|---|---|---|
| DE | 10 2020 111 974 | B3 | 9/2021 |
| JP | 2012-059274 | A | 3/2012 |
| JP | 2017-021651 | A | 1/2017 |
| JP | 2020-199794 | A | 12/2020 |
| WO | WO-2018/138926 | A1 | 8/2018 |
| WO | WO-2020/170640 | A1 | 8/2020 |

OTHER PUBLICATIONS

Extended European Search Report Issued in EP Application No.
22924025.4 dated Nov. 26, 2025 (25 Pages).

* cited by examiner

FIG. 5

MOTION
SICKNESS
SENSITIVITY
INDEX 1.0

MOTION SICKNESS SENSITIVITY INDEX
1.0 (PREVIOUS TIME)→2.0 (THIS TIME)

STRAIGHT ROAD SECTION (CURVATURE 0)

CURVATURE MONOTONOUSLY DECREASED (LATERAL ACCELERATION DECREASED)

D

CONSTANT CURVATURE (STEADY CIRCULAR TURNING)

C

B

CURVATURE MONOTONOUSLY INCREASED (LATERAL ACCELERATION INCREASED)

A

STRAIGHT ROAD SECTION (CURVATURE 0)

x y    z

1

LATERAL
ACCELERATION

72

TIME

HEAD ROLLING
ANGLE OF
OCCUPANT

74b

74a

TIME

VEHICLE INTEGRATED CONTROL DEVICE AND VEHICLE INTEGRATED CONTROL METHOD

TECHNICAL FIELD

The present invention relates to the configuration and the control of a vehicle integrated control device that controls a momentum of a vehicle, and more particularly to a technique that controls a posture of the vehicle so as to improve riding comfort of an occupant or to prevent the incidence of car sickness (motion sickness) of the occupant.

BACKGROUND ART

As a conventional vehicle control device that estimates a car sickness (a motion sickness) of an occupant and controls a vehicle movement for reducing the motion sickness, for example, there has been known a vehicle control device described in patent literature 1. In the Abstract of the patent literature 1, there is the description "A car sickness estimation device (100) is provided with: a sensory conflict amount calculation unit (10) that estimates, on the basis of a head motion of an occupant caused by rocking motion of a vehicle, a conflict amount between a plurality of types of sensory amounts perceived by the occupant for the head motion of the occupant; a driving situation characteristic extraction unit (30) that extracts, on the basis of at least one of the head motion of the occupant and the motion of the vehicle, a characteristic of a driving situation related to motion sickness from the driving situation, a habituation progress state determination unit (20) that determines, on the basis of biometric information of the occupant, whether the habituation of the occupant to the driving situation is progressing; a sensitivity setting unit (40) that sets a sensitivity to the characteristic of the driving situation on the basis of the habituation progress state; a sensory conflict amount correction unit (50) that corrects the sensor conflict amount on the basis of sensitivity; and a car sickness estimation unit (60) that estimates the car sickness state of the occupant on the basis of the sensory conflict amount after the correction."

CITATION LIST

Patent Literature

Patent literature 1: WO 2020/170640

SUMMARY OF INVENTION

Technical Problem

However, the method of estimating motion sickness described in patent literature 1 estimates current progress of motion sickness of the occupant based on a past traveling state and hence, there is a possibility that a control of reducing car sickness is performed only after the motion sickness of the occupant has progressed.

To reduce motion sickness of the occupant more effectively, it is necessary to estimate in advance whether or not the occupant is liable to suffer from motion sickness (sensitivity), and to prevent in advance a vehicle movement that may cause motion sickness before the occupant suffers from motion sickness.

In view of the above-mentioned circumstances, it is an object of the present invention to provide a vehicle integrated control device capable of controlling a posture of a vehicle so as to prevent in advance an occupant who has high sensitivity to motion sickness from suffering from the motion sickness, and a vehicle integrated control method using such a vehicle integrated control device.

Solution to Problem

To overcome the above-mentioned problem, the present invention is characterized by a vehicle integrated control device that includes: a target value generation unit that generates or acquires a control target value of a movement of a vehicle; a motion sickness sensitivity acquisition unit that acquires a motion sickness sensitivity index that is a quantitative value that is likeliness of incidence of motion sickness that differs depending on an occupant characteristic with respect to at least one occupant riding on the vehicle; and a target value correction unit that corrects the control target value based on the control target value and the motion sickness sensitivity index.

The present invention is also characterized by a vehicle integrated control method that includes: (a) a step of generating or acquiring a control target value of movement of a vehicle; (b) a step of acquiring a motion sickness sensitivity index that is a quantitative value of likeliness of incidence of motion sickness that differs depending on an occupant characteristic with respect to at least one occupant riding on the vehicle; and (c) a step of correcting the control target value based on the control target value and the motion sickness sensitivity index.

Advantageous Effects of the Invention

According to the present invention, it is possible to realize a vehicle integrated control device capable of controlling a posture of a vehicle so as to prevent in advance motion sickness with respect to an occupant having high sensitivity to motion sickness, and a vehicle integrated control method that uses the vehicle integrated control device.

Accordingly, the improvement of riding comfort of an occupant and the suppression of the incidence of car sickness (motion sickness) can be realized.

Objects, configurations, and effects other than the above will be apparent from the description of the following embodiments.

BRIEF DESCRIPTION OF DRAWINGS

FIG. 5 is a functional block diagram illustrating an arithmetic operation method of a motion sickness incidence (MSI).

3

Figure 7A:
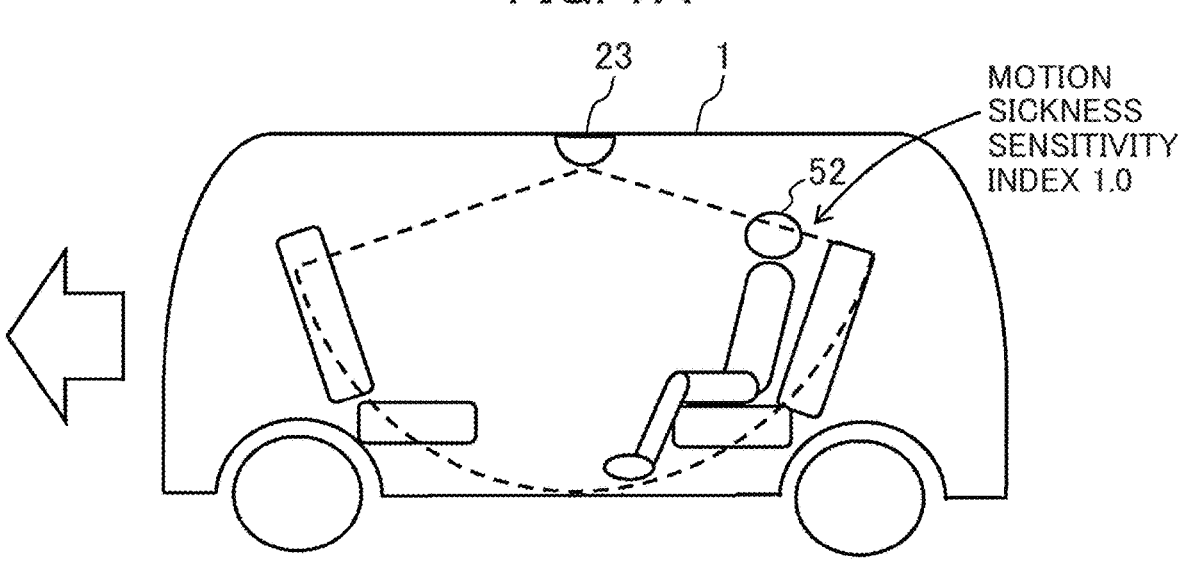
FIG. 7A is a view illustrating one example of the occupant characteristic acquisition unit 23 according to the first embodiment.
Figure 7B:
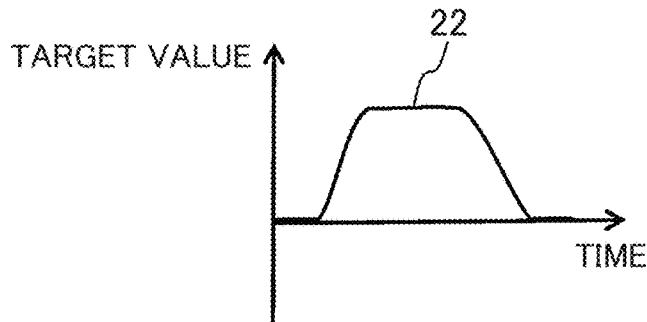

FIG. 7B is a view illustrating one example of transition of a target value 22 according to the first embodiment.

Figure 7C:
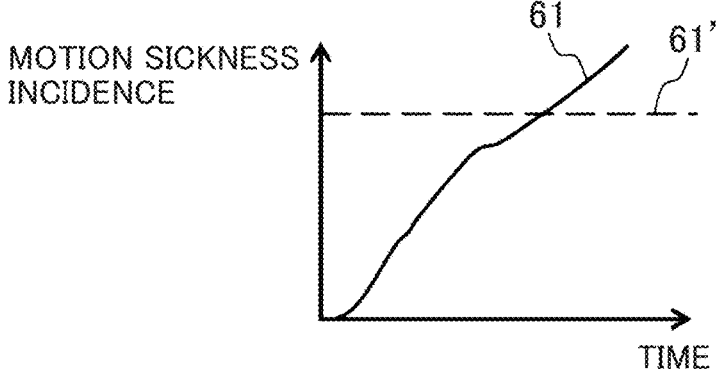

FIG. 7C is a view illustrating one example of the transition of motion sickness incidence 61 according to the first embodiment.

Figures 7D, 8:
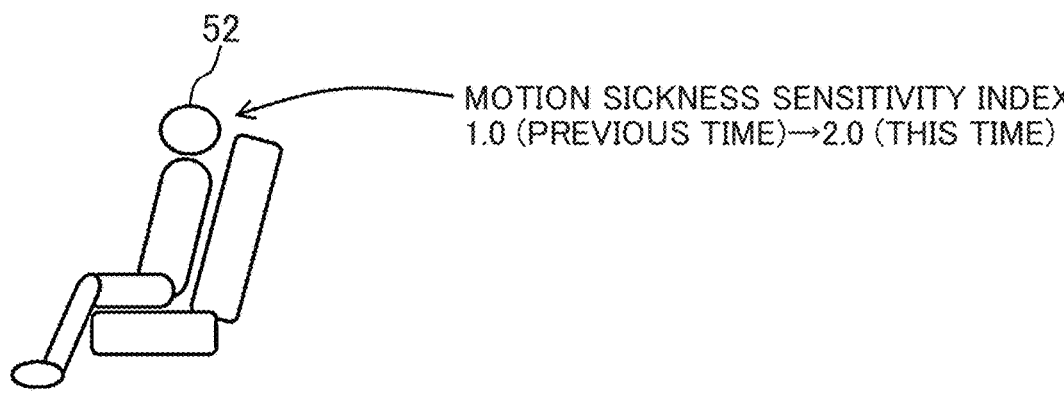

FIG. 7D is a view illustrating one example of a change of a motion sickness sensitivity index 26 according to the first embodiment.

FIG. 8 is a plan view illustrating a vehicle 1 that enters a left curve.

Figure 9:
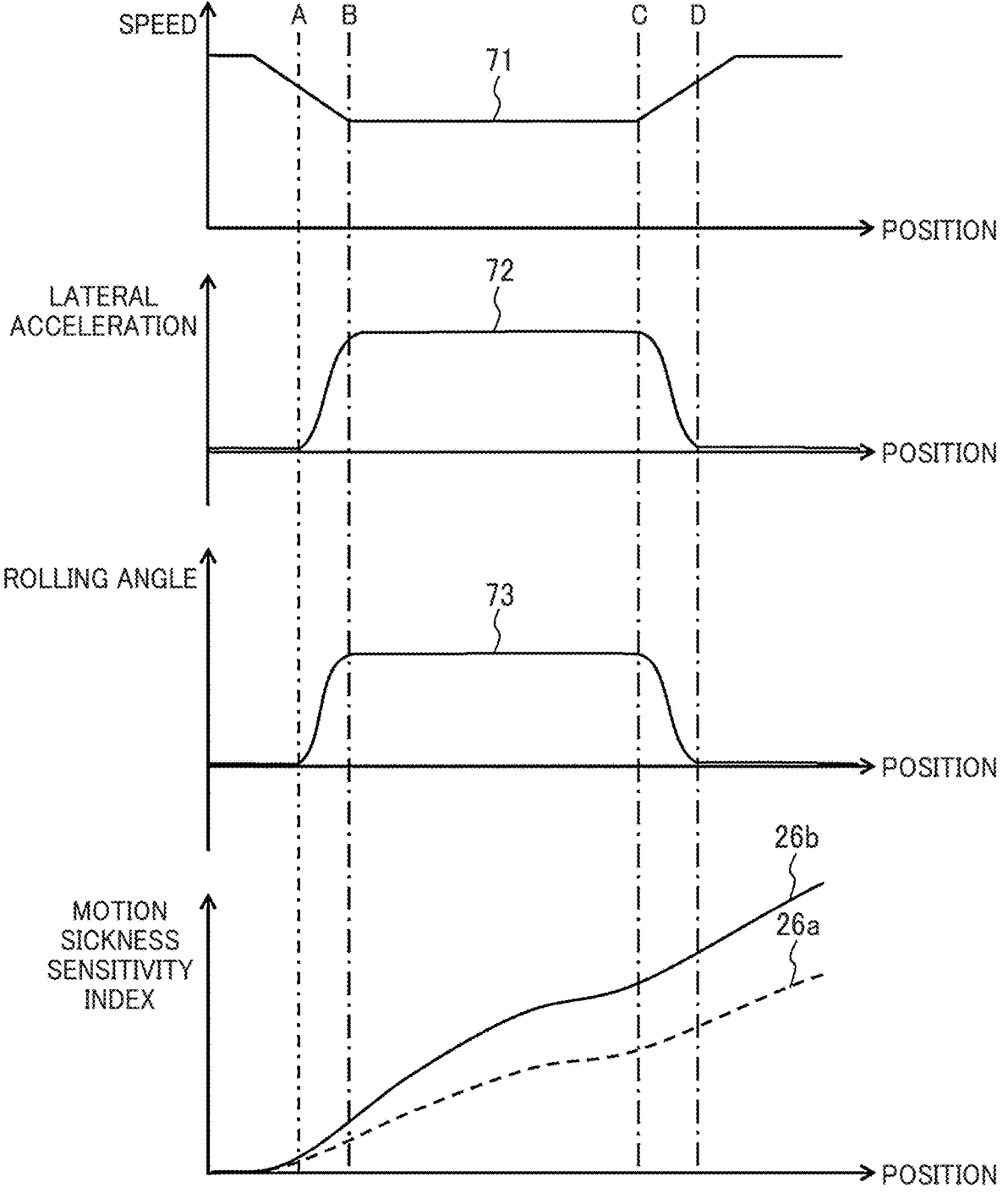

FIG. 9 is a view illustrating the transition of the motion sickness sensitivity index 26 according to the first embodiment.

Figure 10:
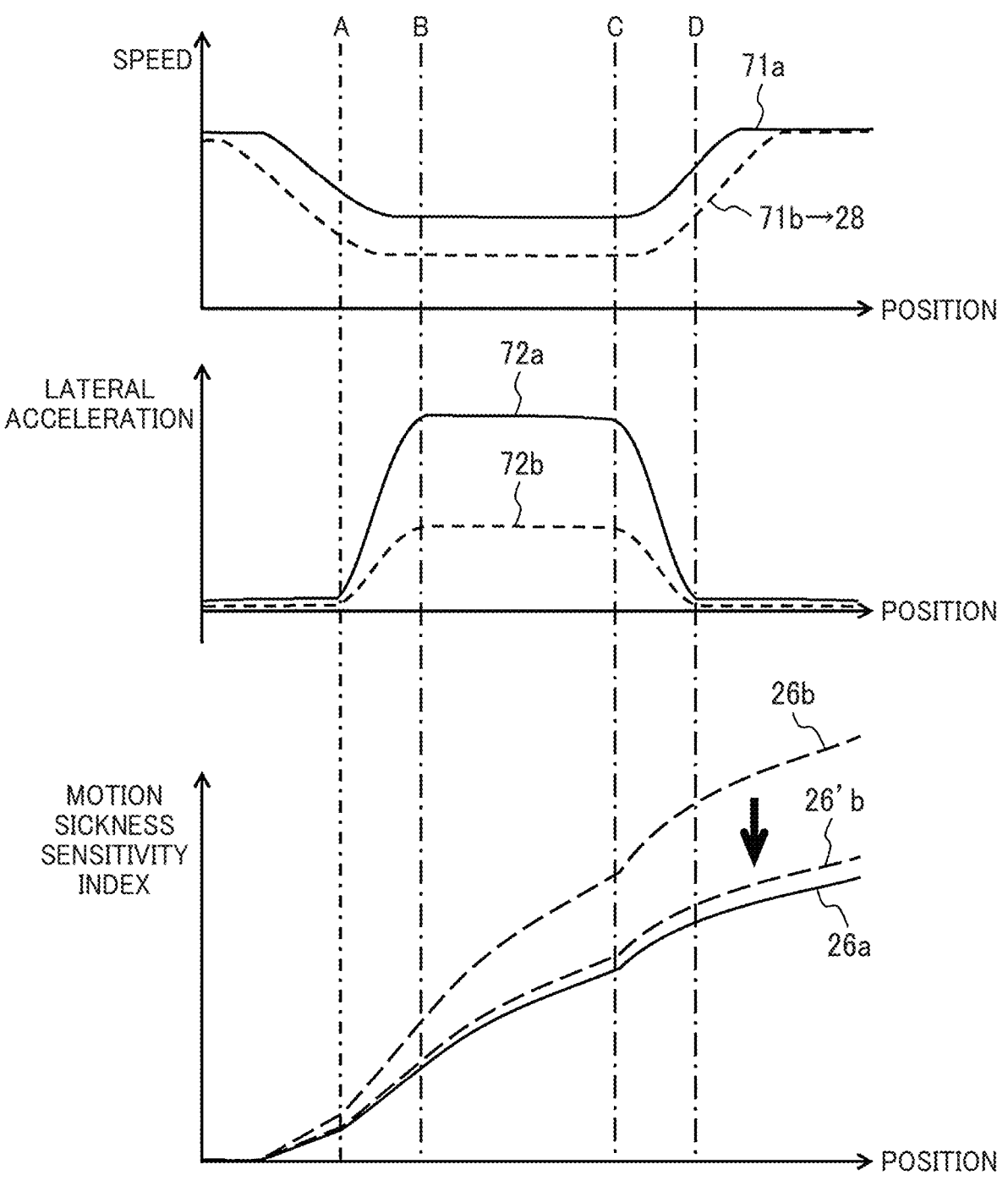

FIG. 10 is a view illustrating the transition of the motion sickness sensitivity index 26 according to the first embodiment.

Figure 11:
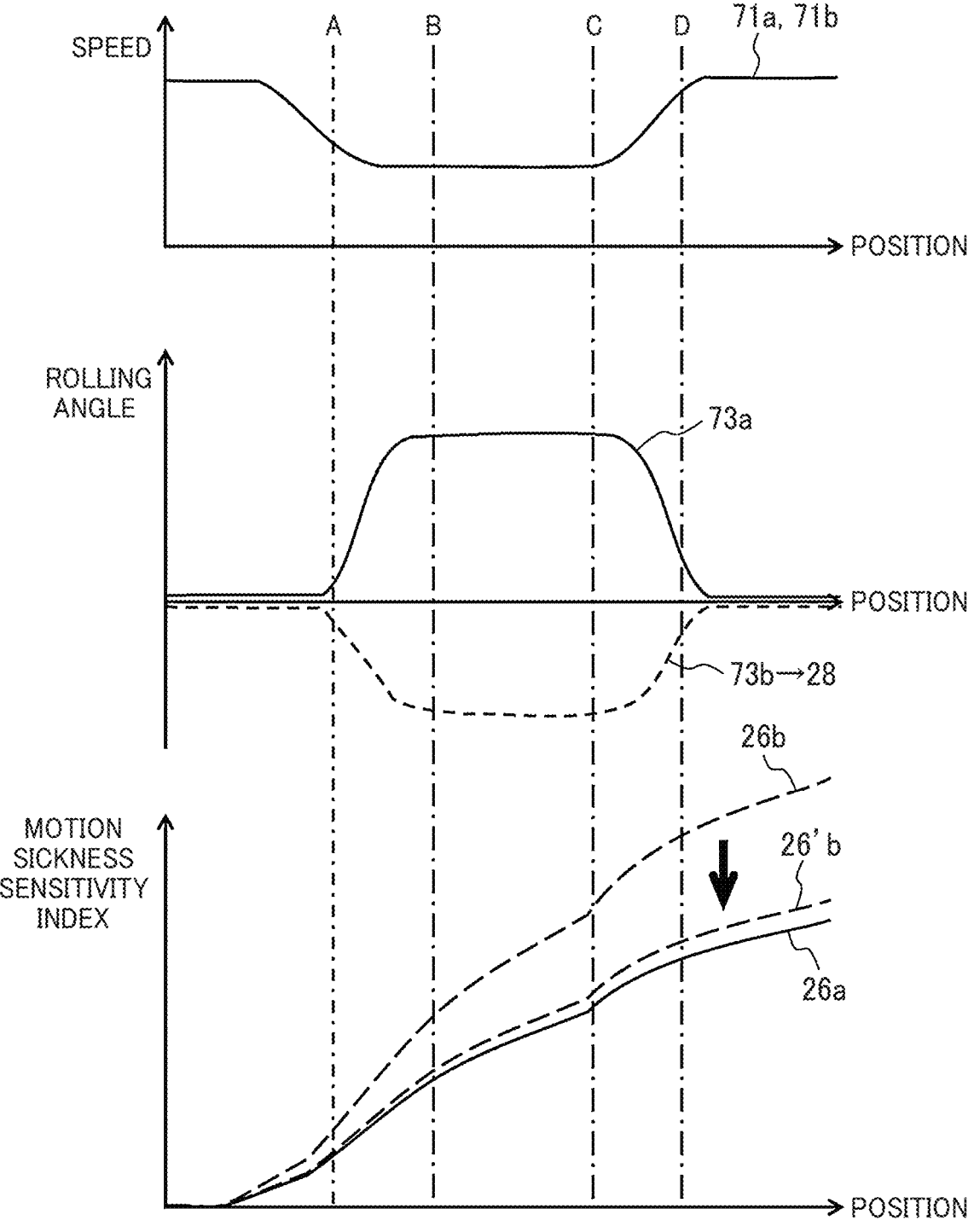

FIG. 11 is a view illustrating the transition of the motion sickness sensitivity index 26 according to the first embodiment.

Figure 12:
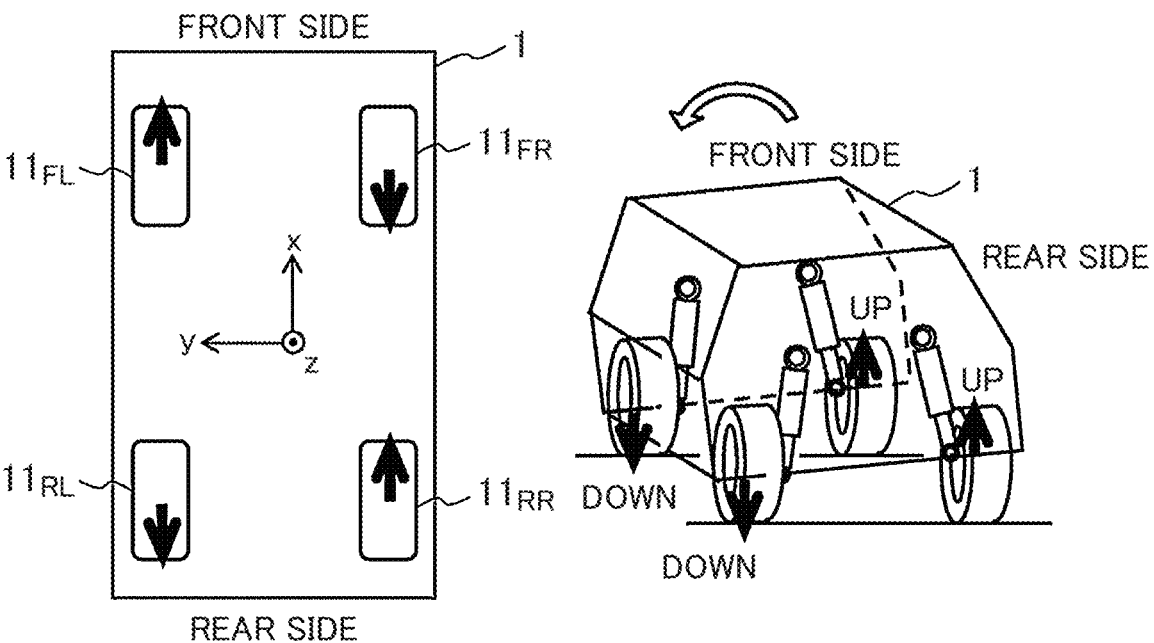

FIG. 12 is a view conceptually illustrating a posture control of a vehicle 1 based on a motor torque or a suspension force.

Figure 13:
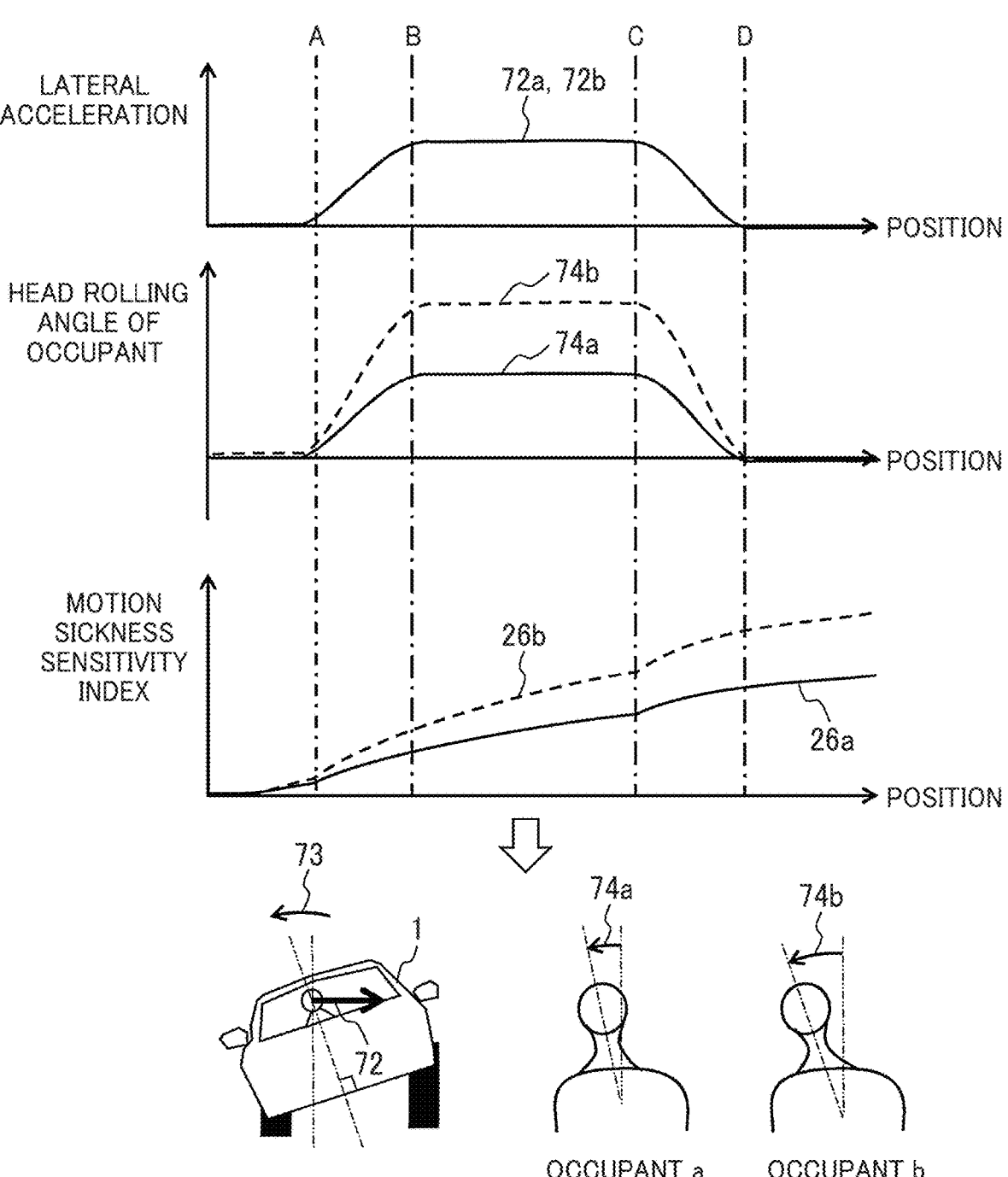

FIG. 13 is a view illustrating one example of the relationship between the motion sickness sensitivity index 26 and a head rolling angle 74 of an occupant according to the first embodiment.

Figure 14:
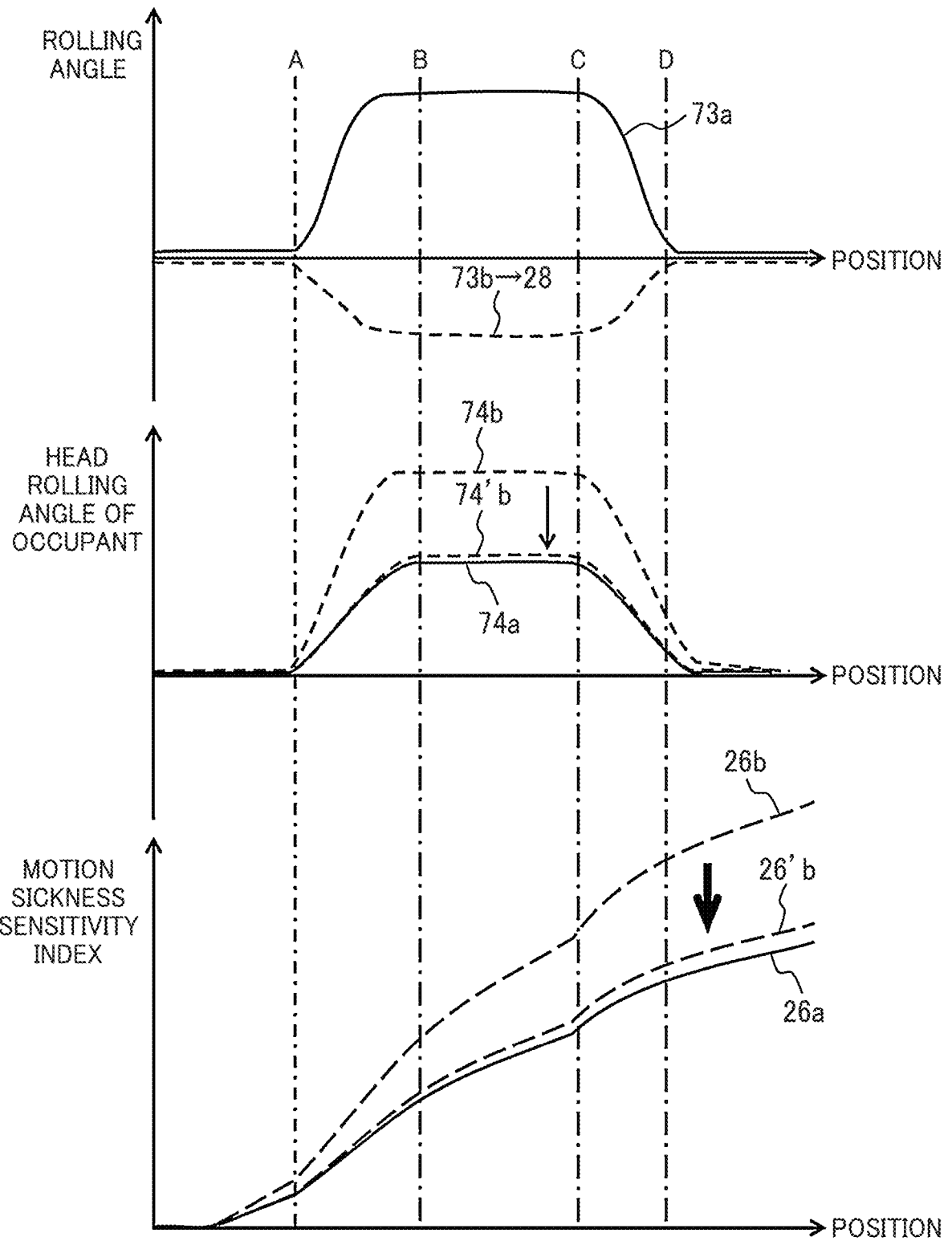

FIG. 14 is a view illustrating one example of the transition of the motion sickness sensitivity index 26 according to the first embodiment.

Figure 15:
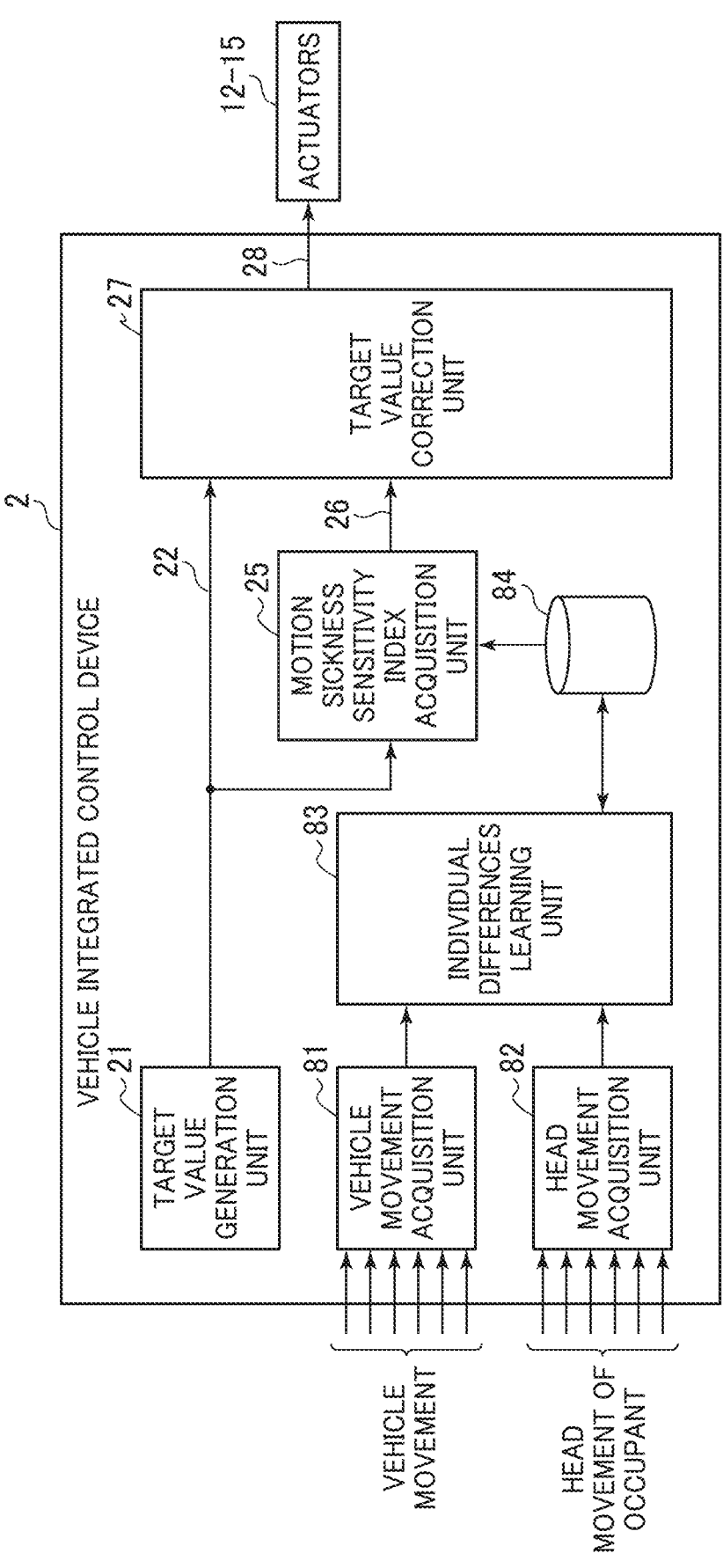

FIG. 15 is a functional block diagram of the vehicle integrated control device 2 according to a second embodiment.

Figure 16A:
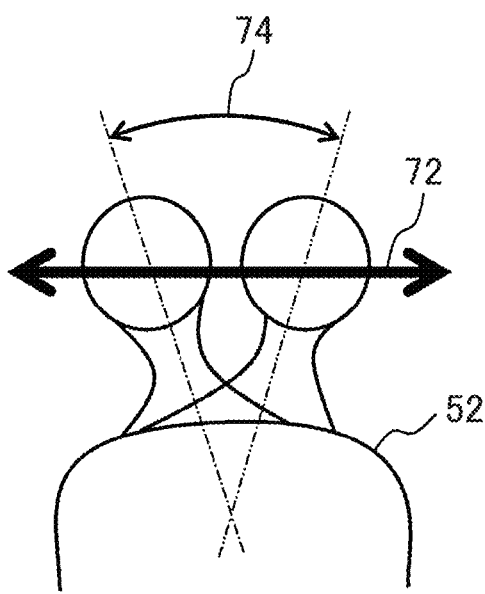

FIG. 16A is a view illustrating the manner where the head rolling angle 74 is generated by lateral acceleration 72.

Figure 16B:
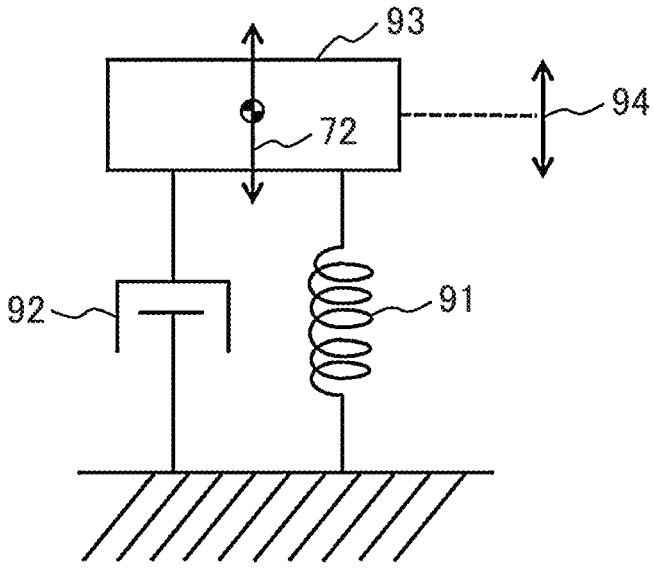

FIG. 16B is a view conceptually illustrating one example of a function of an individual difference learning unit 83 according to the second embodiment.

Figure 17:
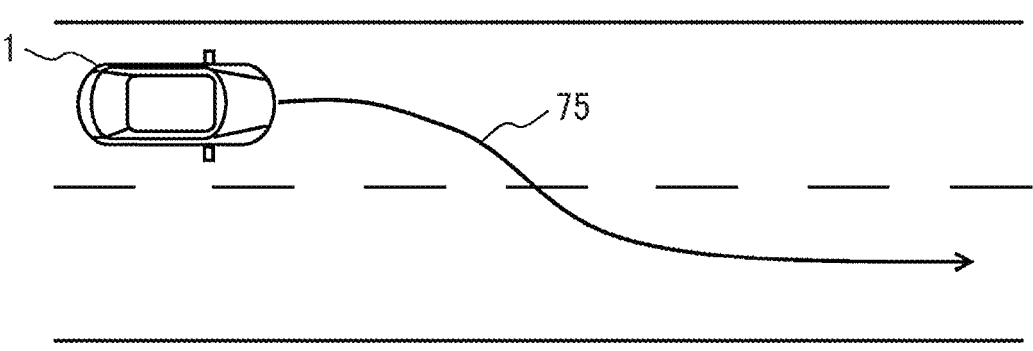

FIG. 17 is a view illustrating the relationship between a traveling trajectory and a lateral acceleration of a vehicle and a head rolling angle of an occupant.

Figure 18:
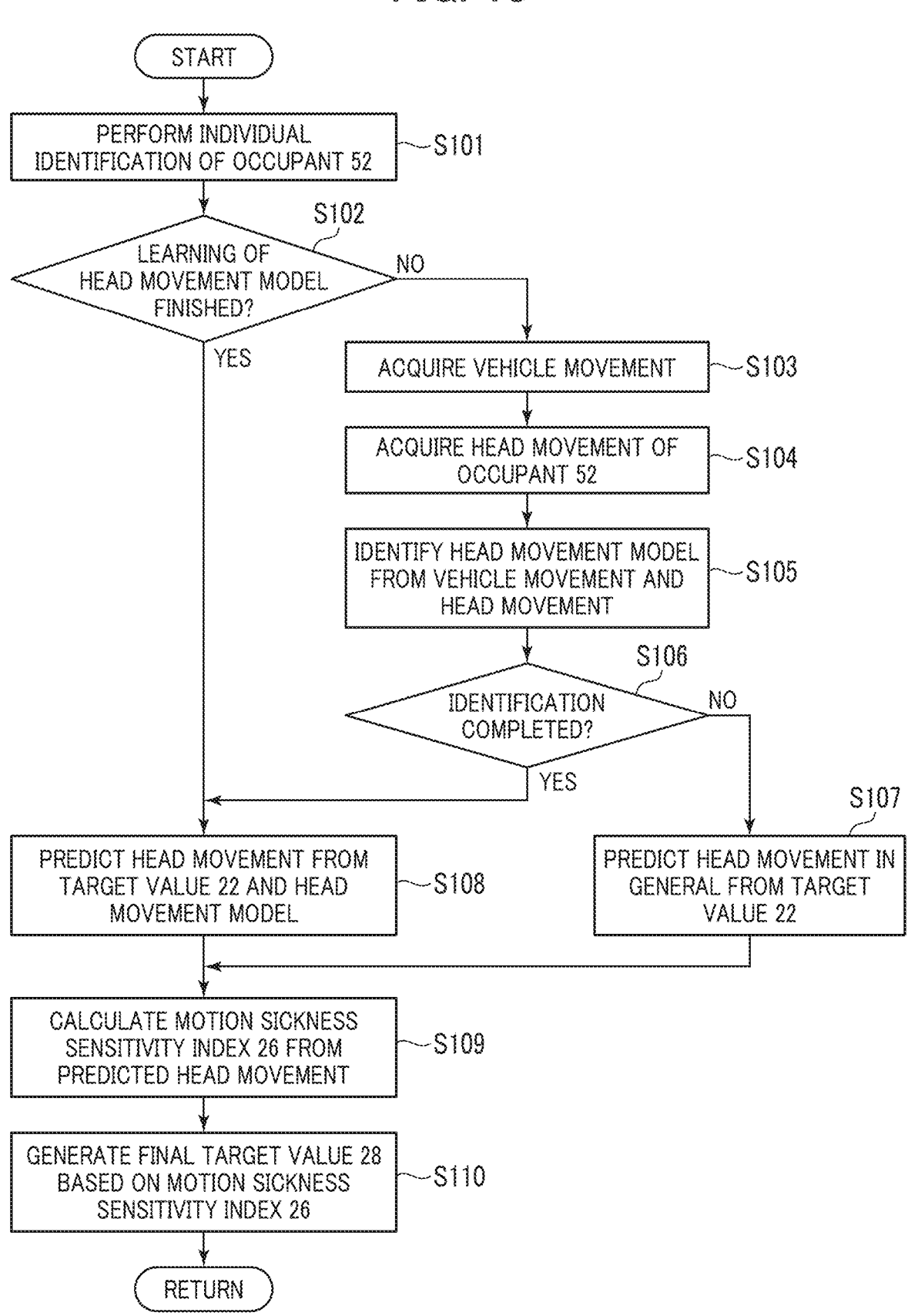

FIG. 18 is a flowchart illustrating processing of a vehicle integrated control device 2 according to the second embodiment.

Figure 19:
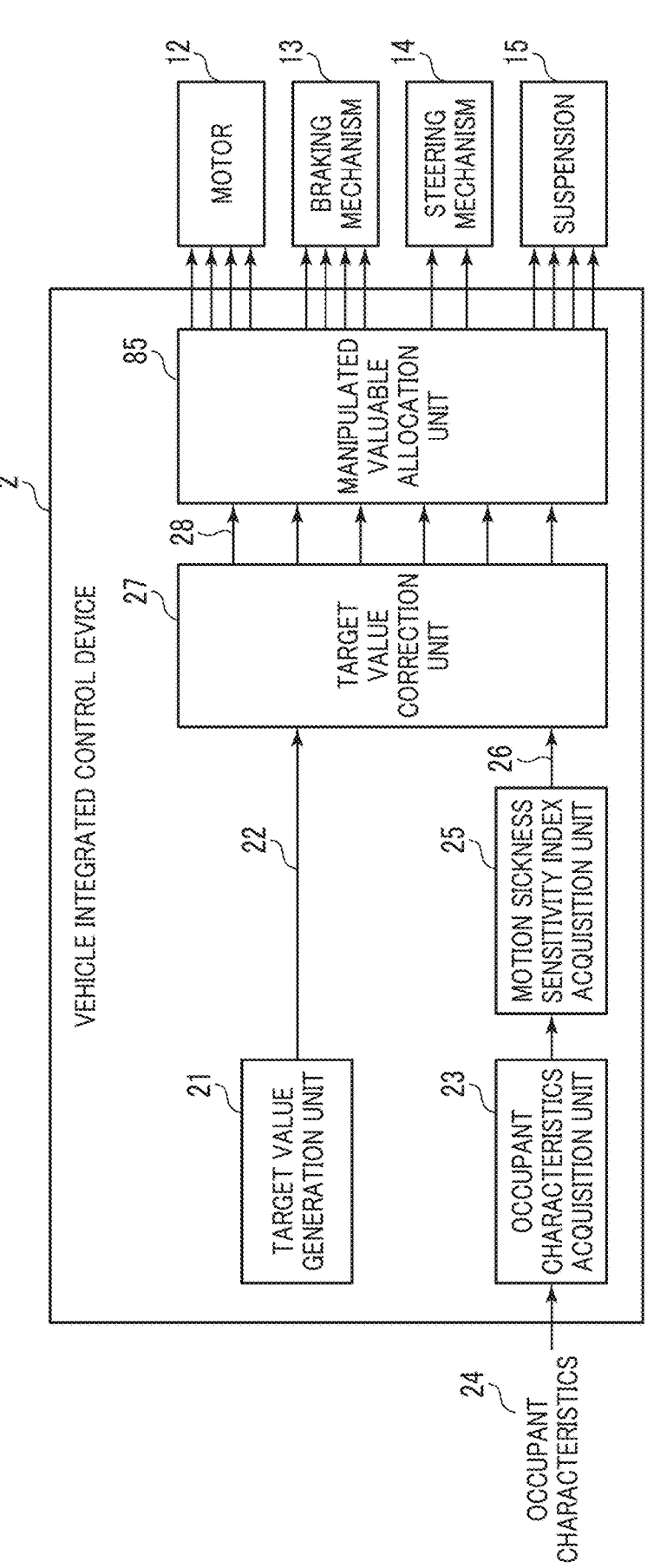

FIG. 19 is a functional block diagram of a vehicle integrated control device 2 according to a third embodiment.

Figure 20:
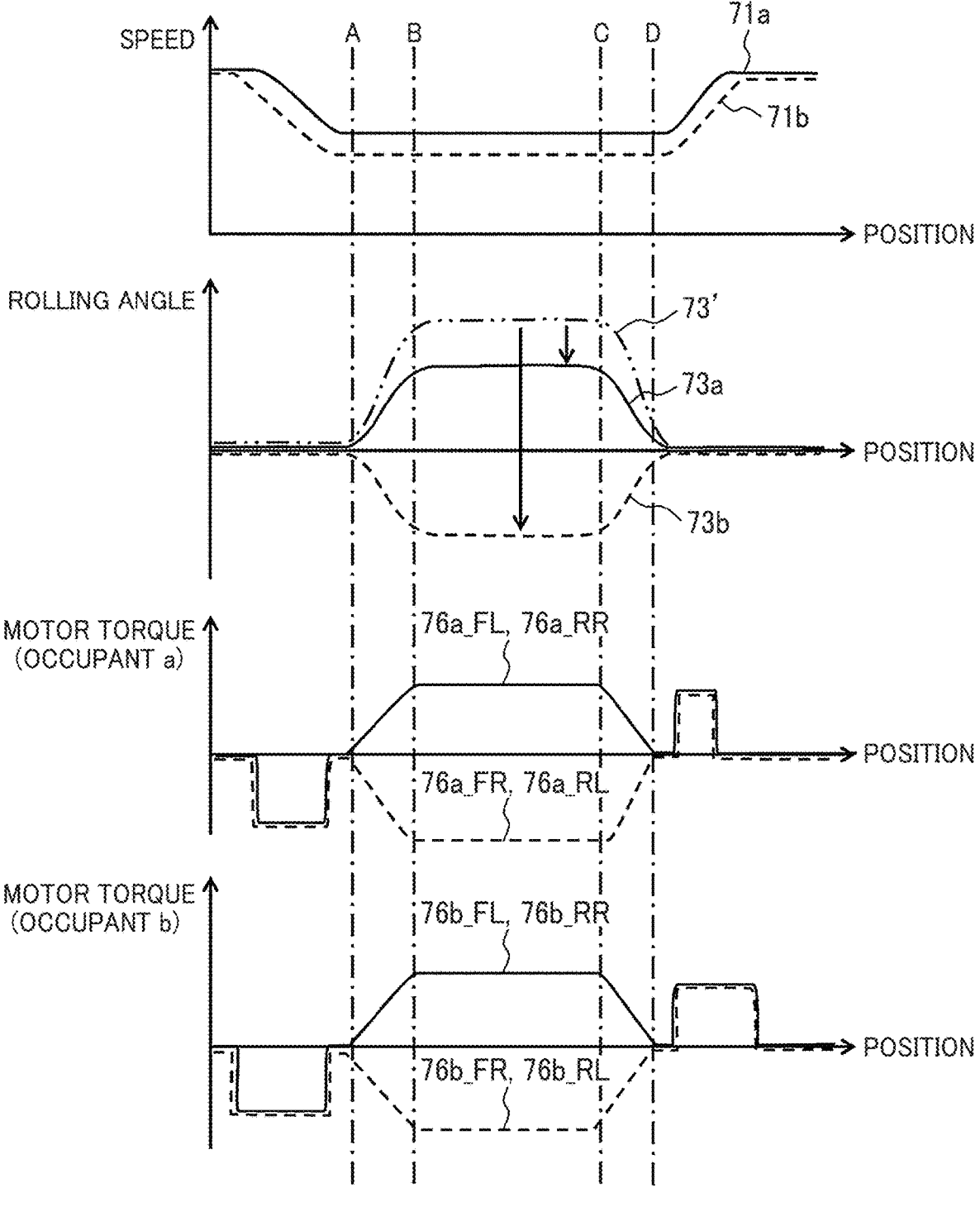

FIG. 20 is a view illustrating one example of a control performed by the vehicle integrated control device 2 according to the third embodiment.

Figure 21:
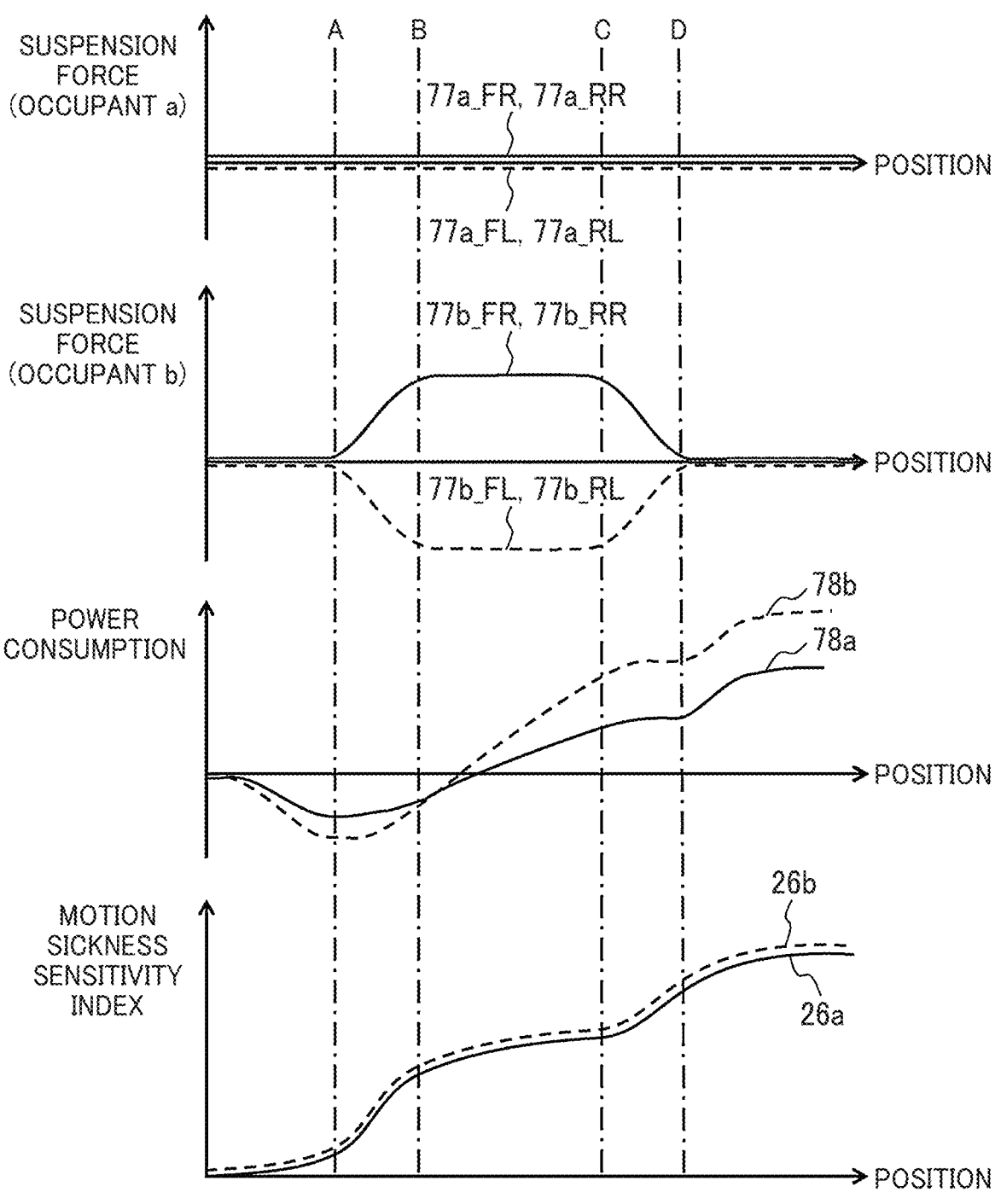

FIG. 21 is a view illustrating one example of the control performed by the vehicle integrated control device 2 according to the third embodiment.

DESCRIPTION OF EMBODIMENTS

Hereinafter, an embodiment of the present invention is described with reference to the drawings. In the respective drawings, the identical constitutional elements are given with the same symbols, and the description is omitted with respect to overlapping portions.

First Embodiment

A vehicle integrated control device and a vehicle integrated control method according to a first embodiment of the present invention are described with reference to FIG. 1 to FIG. 14.

4

Figure 1:
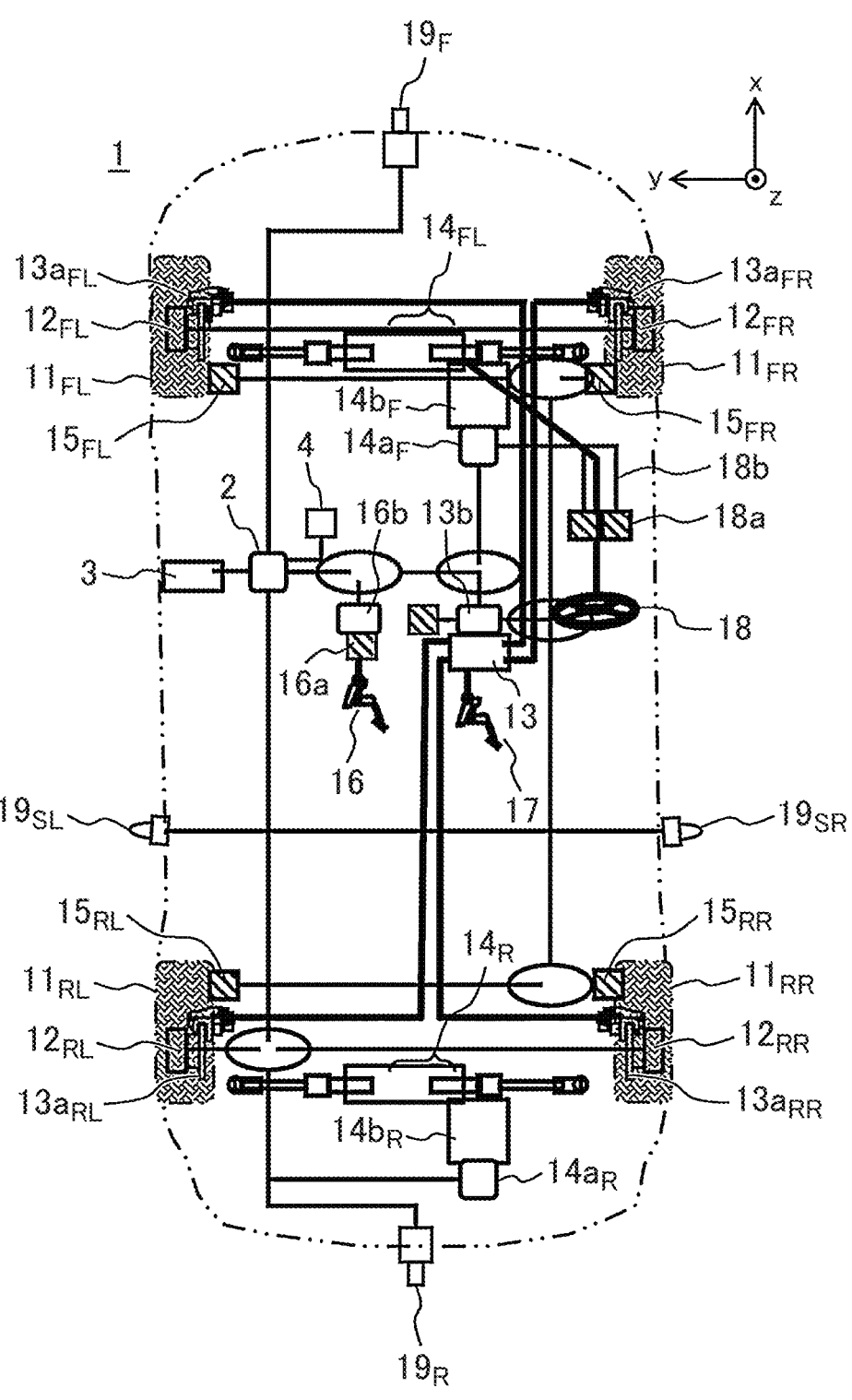
FIG. 1 is a plan view illustrating the overall configuration of a vehicle 1 according to a first embodiment.

FIG. 1 is a plan view illustrating the overall configuration of a vehicle 1 according to the embodiment.

In FIG. 1, numeral 2 indicates a vehicle integrated control device, numeral 3 indicates an external control device, numeral 4 indicates a combine sensor, numeral 11 indicates a wheel, numeral 12 indicates a motor, numeral 13 indicates a braking mechanism, numeral 14 indicates a steering mechanism, numeral 15 indicates a suspension, numeral 16 indicates an acceleration pedal, numeral 17 indicates a braking pedal, and numeral 18 indicates a steering wheel. In the drawings, symbol FL indicates the configuration corresponding to a left front side, symbol FR indicates the configuration corresponding to a right front side, symbol RL indicates the configuration corresponding to a left rear side, and symbol RR indicates the configuration corresponding to a right rear side. To take the wheels 11, for example, symbols $11_{FL}$, $11_{FR}$, $11_{RL}$, $11_{RR}$ respectively indicate the left front wheel, the right front wheel, the left rear wheel and the right rear wheel. Further, symbol F indicates the configuration corresponding to a front side and symbol R indicates the configuration corresponding to a rear side.

Hereinafter, the detail of the respective configurations is sequentially described by defining the longitudinal direction of the vehicle 1 as an x axis (front direction being assumed as positive), the lateral direction as a y axis (left direction being positive) and the vertical direction as a z axis (upper direction being positive).

The vehicle integrated control device 2 is a control device that performs an integrated control of the respective actuators such as the motor 12, the braking mechanism 13, the steering mechanism 14 and the suspension 15 corresponding to a manipulation of a driver, an external command from the external control device 3 and detection signals of the combined sensor 4 (the detection signals relating to control axes of six degrees of freedom in total of respective longitudinal, lateral and vertical accelerations and the respective rates of rolling, pitching, and yaw).

The vehicle integrated control device 2 is, to be more specific, an electronic control unit (ECU) that includes an arithmetic operation device such as a central processing unit (CPU), a main storage device such as a semiconductor memory, and auxiliary storage device, and a hardware such as a communication device. By allowing the arithmetic operation device to execute a program loaded to the main storage device from the auxiliary storage device, the respective functions described later are realized. Hereinafter, such well-known techniques are described while suitably omitting the description when appropriate.

The external control device 3 is a host controller for performing an operation assist control and an autonomous driving control via the vehicle integrated control device 2. The external control device 3 calculates a speed command value and acceleration command value for realizing an adoptive cruise control (ACC) to follow a preceding vehicle based on outside world information that an outside world sensor 19 (a camera, a radar, LiDAR or the like) acquired or a yaw command value or the like for realizing a lane keep control (LKC) that maintains an in-lane traveling, and outputs these command values to the vehicle integrated control device 2 as external commands.

In FIG. 1, the vehicle integrated control device 2 and the external control device 3 are formed as separate bodies from each other. However, both the vehicle integrated control device 2 and the external control device 3 may be realized by one ECU.

As the outside world sensor 19, a fish eye camera having a viewing angle of, for example, 180° C. may be mounted on a front surface, left and right side surfaces, and a rear surface of the vehicle 1 respectively (19$_F$, 19$_{SL}$, 19$_{SR}$, 19$_R$) so as to detect relative distances and relative speeds between the vehicle 1 and objects such as other vehicles, bicycles, pedestrians, obstacles existing around the vehicle 1.

In this embodiment, as an example of the sensor configuration, the combination of the above-mentioned sensors is described. However, the sensor configuration may not be limited to such combination of the above-mentioned sensors, and may be the combination of an ultrasonic sensor, a stereoscopic camera, an infrared camera, or a razer radar capable of sensing the surrounding of 360° C. may be mounted on a ceiling of the vehicle 1. The above-mentioned sensor signals (signals outputted from the sensors) are inputted to the vehicle integrated control device 2 or the external control device 3.

Then, a drive system of the vehicle 1 is described. As a main part of the drive system, a torque generation device that imparts a drive force to the respective wheels 11 is mounted on the vehicle 1. One example of the torque generation device is an engine or a motor that transmits a drive force to the left and right pairs of wheels 11 by way of a differential gear and a driveshaft. Another example of the torque generation device is in-wheel motors 12 that independently drive the respective wheels 11. Hereinafter, the embodiment that is realized on the premise of the vehicle structure illustrated in FIG. 1 where the in-wheel motor 12 is mounted on the respective wheels 11 is described in detail.

In a case a driver intends to advance (or retract) the vehicle 1, the driver sets the gearshift as desired, and, thereafter, manipulates an acceleration pedal 16. At this stage of the operation, a stroke sensor 16$a$ detects a step-in amount of the acceleration pedal 16, and an acceleration control device 16$b$ outputs an acceleration command obtained by converting the step-in amount to the vehicle integrated control device 2. The vehicle integrated control device 2 supplies electric power corresponding to the inputted acceleration command to the motors 12 of the respective wheels from a battery not illustrated in the drawing so as to control the respective motor torques. As a result, corresponding to the manipulation of the acceleration pedal 16, the vehicle 1 can be accelerated or decelerated.

Further, in a case where a drive assist or autonomous driving is performed in response to an external command from the external control device 3, the vehicle integrated control device 2 supplies desired electric power corresponding to the inputted external command to the motors 12 of the respective wheels so as to control the respective motor torques. As a result, the vehicle 1 is accelerated or decelerated, and the desired drive assist or autonomous driving is performed.

Next, a braking system of the vehicle 1 is described. On the vehicle 1, as a main part of the braking system, wheel cylinders 13$a$ that impart a braking force to the respective wheels 11 are mounted. The wheel cylinder 13$a$ is constituted of, for example, a cylinder, a piston, a pad, a disk rotor and the like. In the wheel cylinder 13$a$, the piston performs the thrust movement due to a working liquid supplied from a master cylinder, the pad connected to the piston is pressed to the disk rotor rotating together with the wheel 11, and a braking torque that acts on the disk rotor forms a braking force that acts between the wheel 11 and a road surface.

In a case where a driver wants to apply braking to the vehicle 1, the driver manipulates the braking pedal 17. At this point of time, a step-in force that the driver applies to the braking pedal 17 is increased by a braking booster (not illustrated in the drawing), and an oil pressure substantially proportional to the step-in force is generated by the master cylinder. The generated oil pressure is supplied to the respective wheel cylinders 13$a_{FL}$, 13$a_{FR}$, 13$a_{RL}$, and 13$a_{RR}$ via the braking mechanism 13 and hence, the pistons of the wheel cylinders 13$a$ of the respective wheels are pressed to the disc rotors in response to a brake pedal manipulation by a driver so that a braking force is generated in the respective wheels.

In the vehicle 1 on which the vehicle integrated control device 2 is mounted, a braking booster and a master cylinder may be omitted. In this case, the vehicle 1 may adopt a mechanism where the brake pedal 17 and the brake mechanism 13 are directly connected to each other, and when a driver presses the brake pedal 17, the brake mechanism 13 is directly operated.

Further, in a case where the drive support or the autonomous driving is performed in response to an external command from the external control device 3, the vehicle integrated control device 2, in response to an inputted external command, controls the braking mechanism 13 and the wheel cylinders 13$a$ of the respective wheels via a braking control device 13$b$. As a result, braking is applied to the vehicle 1, and the desired drive support and the autonomous driving are performed.

The braking control device 13$b$ also has a function of converting a manipulated variable of the brake pedal 17 by a driver to a braking command, and of outputting the braking command to the vehicle integrated control device 2 as an external command.

Next, a steering system of the vehicle 1 is described. On the vehicle 1, as a main part of the steering system, a steering mechanism 14 that imparts a steering force to the respective wheels 11 is mounted. In FIG. 1, the steering system includes: a steering mechanism 14$_F$ on a front side that steers the front wheels 11$_F$ (the left front wheel 11$_{FL}$, the right front wheel 11$_{FR}$), and a steering mechanism 14R on a rear side that steers the rear wheels 11$_R$ (the left rear wheel 11$_{RL}$, the right rear wheel 11$_{RR}$). However, it is unnecessary to provide the steering mechanism 14 on the front side and the rear side. For example, the steering mechanism 14$_R$ on the rear side may be omitted.

In a case that a driver wants to steer the vehicle 1, the driver manipulates the steering wheel 18. In this case, "steering torque" and "steering angle" that the driver inputs via the steering wheel 18 are detected by a steering torque detection device 18$a$ and a steering angle detection device 18$b$. A steering control device 14$a_F$ on a front side controls the steering motor 14$b_F$ on a front side based on a detected steering torque and a detected steering angle, and generates an assist torque for steering the front wheel 11$_F$. In the same manner, a steering control device 14$a_R$ on a rear side controls the steering motor 14$b_F$ on a rear side based on a detected steering torque and a detected steering angle, and generates an assist torque for steering the rear wheel 11$_R$.

Further, in a case where the drive assist and the autonomous driving are performed in response to an external command from the external control device 3, the vehicle integrated control device 2 controls a steering torque of the steering motor 14$b$ via the steering control device 14$a$. As a result, the vehicle 1 is steered, and desired drive assist or the desired autonomous driving is performed. In this case, the steering wheel 18 may be omitted.

Next, a suspension system of a vehicle 1 is described. A suspension 15 is mounted on the vehicle 1. The suspension 15 forms a main part of the suspension system and improves stability of a vehicle body and riding comfort by absorbing vibrations and an impact generated on the respective wheels 11. The suspension 15 is, for example, a semi active suspension that is formed by combining a dumper capable of changing viscosity and a coil spring, a combination of an actuator capable of adjusting a length thereof, a dumper and a coil spring, or is a full active suspension that can arbitrarily change a relative distance between the vehicle body and the wheel 11.

The vehicle integrated control device 2 improves a riding comfort and the like and, and at the same time, properly controls a posture of the vehicle 1 corresponding to an environment by controlling viscosity of the semi active suspension or the length of the full active suspension.

Figure 2:
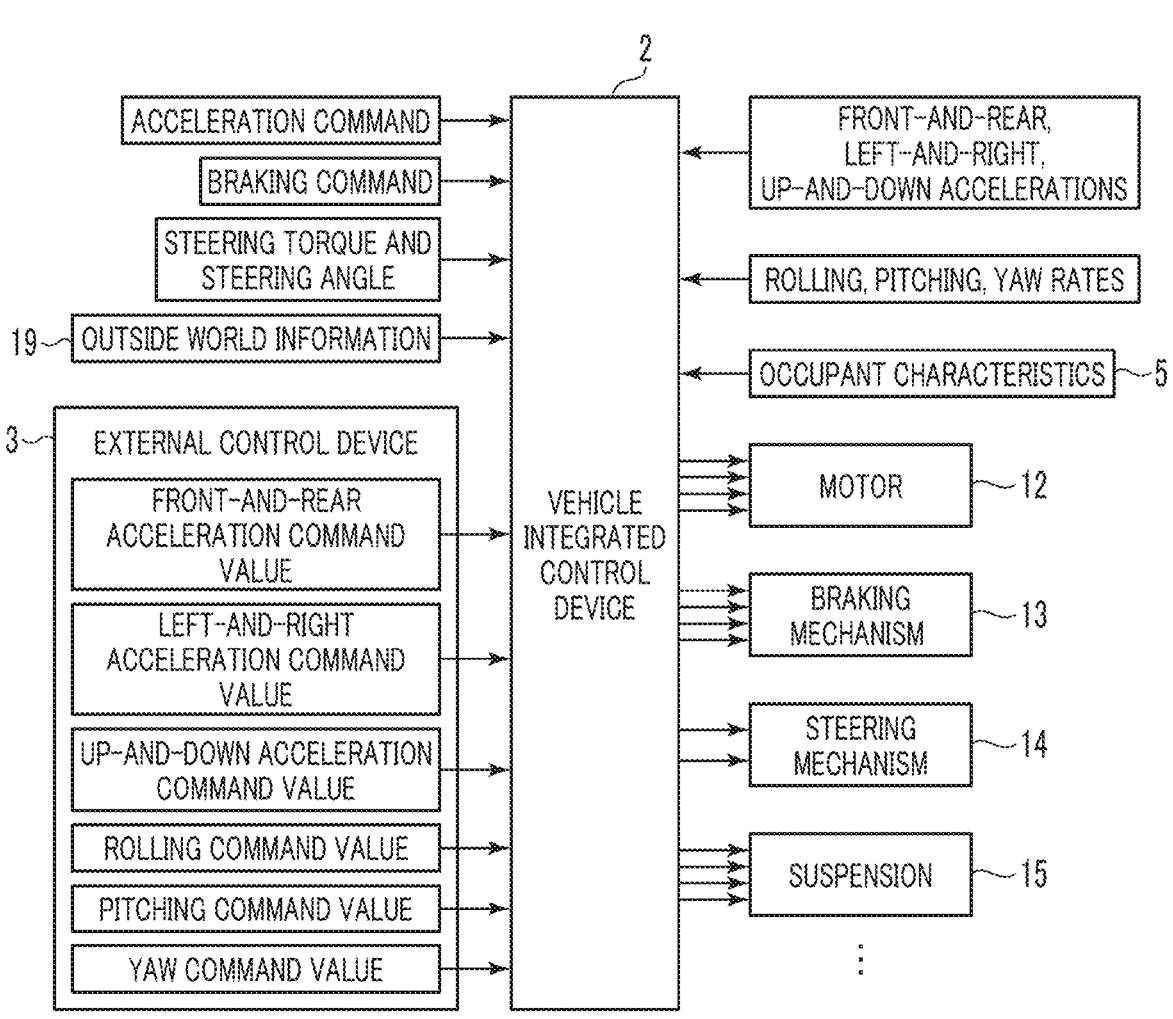
FIG. 2 is a schematic block diagram illustrating input/output signals of a vehicle integrated control device 2 according to the first embodiment.

Next, using FIG. 2, inputting/outputting of the vehicle integrated control device 2 is described. FIG. 2 is a schematic view listing input signals and output signals to and from the vehicle integrated control device 2. As illustrated in FIG. 2, to the vehicle integrated control device 2, an acceleration command, a braking command, a steering torque, a steering angle and the like that are generated when a driver manipulates the acceleration pedal 16, the brake pedal 17, the steering wheel 18 and the like are inputted as external commands.

Further, to the vehicle integrated control device 2, external commands of six degrees of freedom at maximum are inputted out of a longitudinal acceleration command value, a lateral acceleration command value, a vertical acceleration command value, a rolling command value, a pitching command value, and a yaw command value that the external control device 3 generates during a drive assist control or an autonomous drive control.

Further, to the vehicle integrated control device 2, the respective detection values of longitudinal acceleration, lateral acceleration and vertical acceleration, and respective values of the respective rates of rolling, pitching and yaw are inputted from the combine sensor 4.

Based on the above-mentioned external commands and detection values, the vehicle integrated control device 2 properly distributes the respective manipulated valuables of the motor 12 ($12_{FL}$ to $12_{RR}$), the braking mechanism 13 (the wheel cylinders $13a_{FL}$ to $13a_{RR}$), the steering mechanism 14 (steering motors $14b_F$, $14b_R$), the suspension 15 ($15_{FL}$ to $15_{RR}$) (hereinafter, symbols 12 to 15 being also collectively referred to as actuators), and performs the respective controls of driving, braking, steering and suspension thus realizing a desired vehicle control including a posture control.

The vehicle 1 illustrated in FIG. 1 corresponds to manual driving and hence, external commands attributed to a driver are also exemplified in FIG. 2. However, the present invention is also applicable to the vehicle 1 corresponding to only a complete autonomous driving or a remote manipulation. In this case, the vehicle integrated control device 2 may be configured such that the external commands attributed to a driver are omitted. During the autonomous driving, external commands of six degrees of freedom at maximum may be inputted from the external control device 3, or a target value for autonomous driving may be generated using external information from the external sensors 19 and map information stored in the vehicle integrated control device 2. In this embodiment, the description is made on the premise that the target value for autonomous driving is generated in the vehicle integrated control device 2.

An Occupant characteristic 5 is further inputted into the vehicle integrated control device 2. Although the detail of such inputting is described later, a camera is mounted in the cabin of the vehicle 1, and sensitivity of motion sickness (car sickness) is estimated by measuring the movement of a head of an occupant. Alternatively, the vehicle integrated control device 2 may include a system that acquires information relating to motion sickness (car sickness) sensitivity of an occupant in the vehicle from a mobile terminal device that the occupant possesses.

Figure 3:
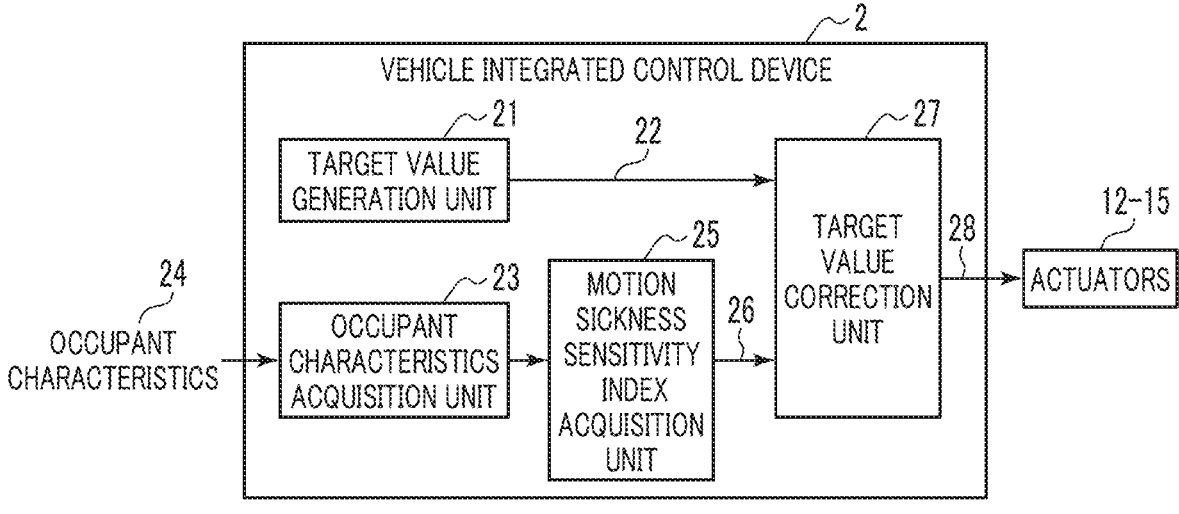
FIG. 3 is a functional block diagram of the vehicle integrated control device 2 of the first embodiment.

FIG. 3 is a functional block diagram of the vehicle integrated control device 2. In FIG. 2, the case is exemplified where three kinds of external commands (an acceleration command, a braking command, a steering torque and steering angle) attributed to a driver are inputted, and external commands of six kinds at maximum are inputted from the external control device 3. However, as described previously, in the embodiment, the detail of the vehicle integrated control device 2 of the present embodiment is described in detail by taking the configuration where a target value for autonomous driving is generated in the vehicle integrated control device 2.

As illustrated in FIG. 3, the vehicle integrated control device 2 of the present embodiment is constituted of at least a target value generation unit 21, an occupant characteristic acquisition unit 23, a motion sickness sensitivity index acquisition unit 25, and a target value correction unit 27.

The target value generation unit 21 sets a vehicle movement target that realizes a specific driving task in autonomous driving (tracing a route or traveling at the same speed as a preceding vehicle and the like) as a target value 22, and outputs the target value 22 to the target value correction unit 27. The target value 22 is, in general, constituted of three kinds of command values consisting of a longitudinal acceleration command value, a lateral acceleration command value and a yaw command value. In addition to the above, the target generation unit generates a rolling angle command value, a pitching angle command value, a vertical direction acceleration command value. That is, the target value generation unit generates six kinds of command values at maximum. In a case where three kinds of external commands (an acceleration command, a braking command, a steering torque and a steering angle) attributed to a driver are inputted, the target value generation unit 21 converts these external commands into the longitudinal acceleration command value, the lateral acceleration command value and a yaw command value, and outputs these command values as target values 22.

The occupant characteristic acquisition unit 23 acquires an occupant characteristic 24 via sensors mounted in the vehicle 1 and an input means. As described later, the occupant characteristic 24 is an index or physical quantity that expresses likeliness of incidence (sensitivity) of a motion sickness relating to an occupant in the vehicle.

Figure 4A:
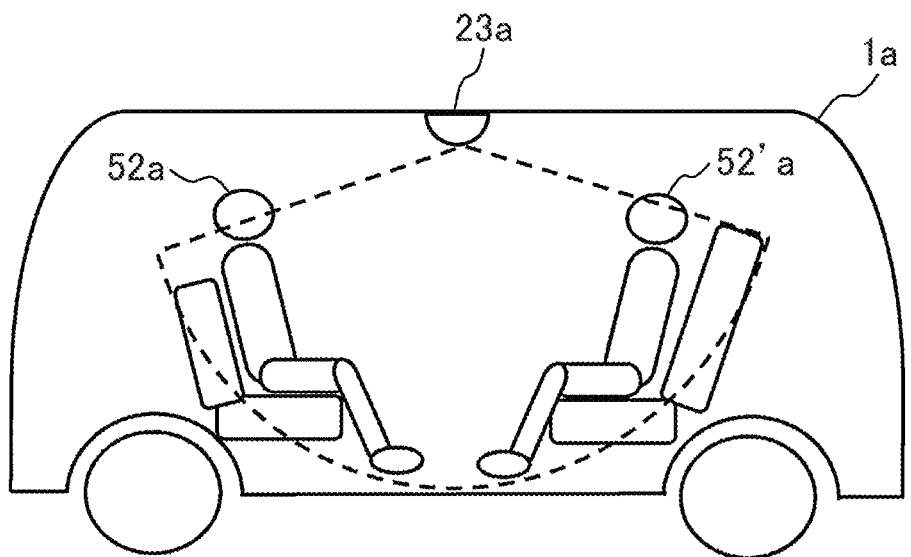
FIG. 4A is a view illustrating one example of an occupant characteristic acquisition unit 23 of the first embodiment.

One example relating to the occupant characteristic acquisition unit 23 is described with reference to FIG. 4A and FIG. 4B. FIG. 4A illustrates the case where a vehicle 1a is a transit bus capable of performing autonomous driving. In FIG. 4A, the occupant characteristic acquisition unit 23a is a camera mounted on a ceiling and having a field view of 360° C. The camera detects a riding position of the occupant 52a (two occupants 52a and 52'a, exemplified in FIG. 4A), riding direction, a posture, movement of head, a sight of view, a task operating in the vehicle (reading, sleeping or the like) and the like as the occupant characteristic 24. The shape and the position of the camera are not limited, and a plurality of cameras may be mounted in the cabin or the camera may not have a field view of 360° C.

Figure 4B:
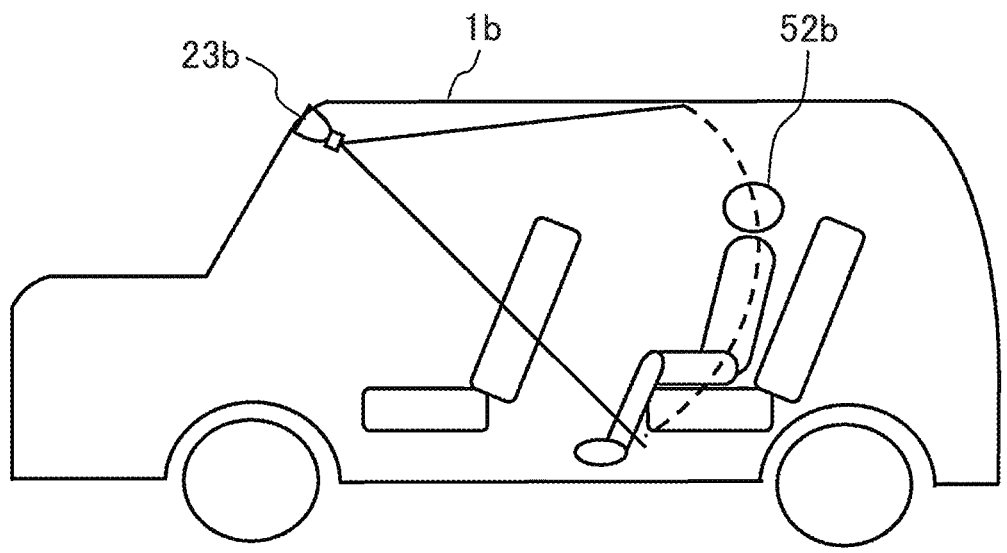
FIG. 4B is a view illustrating one example of the occupant characteristic acquisition unit 23 of the first embodiment.

Alternatively, as illustrated in FIG. 4B, in a case where a vehicle 1b has a shape of a car, the occupant characteristic acquisition unit 23b may be a camera mounted in the vicinity of a connecting point between a windshield and a ceiling (usually, a portion where a rearview mirror is mounted). In this case, the occupant characteristic acquisition unit 23 detects the occupant characteristic 24 of the occupant 52*b* seated on a rear seat.

The motion sickness sensitivity index acquisition unit 25 predicts or acquires whether or not the occupant is likely to suffer from a motion sickness (motion sickness sensitivity) based on the occupant characteristic 24 acquired by the occupant characteristic acquisition unit 23, and calculates a motion sickness sensitivity index 26.

Figure 5:
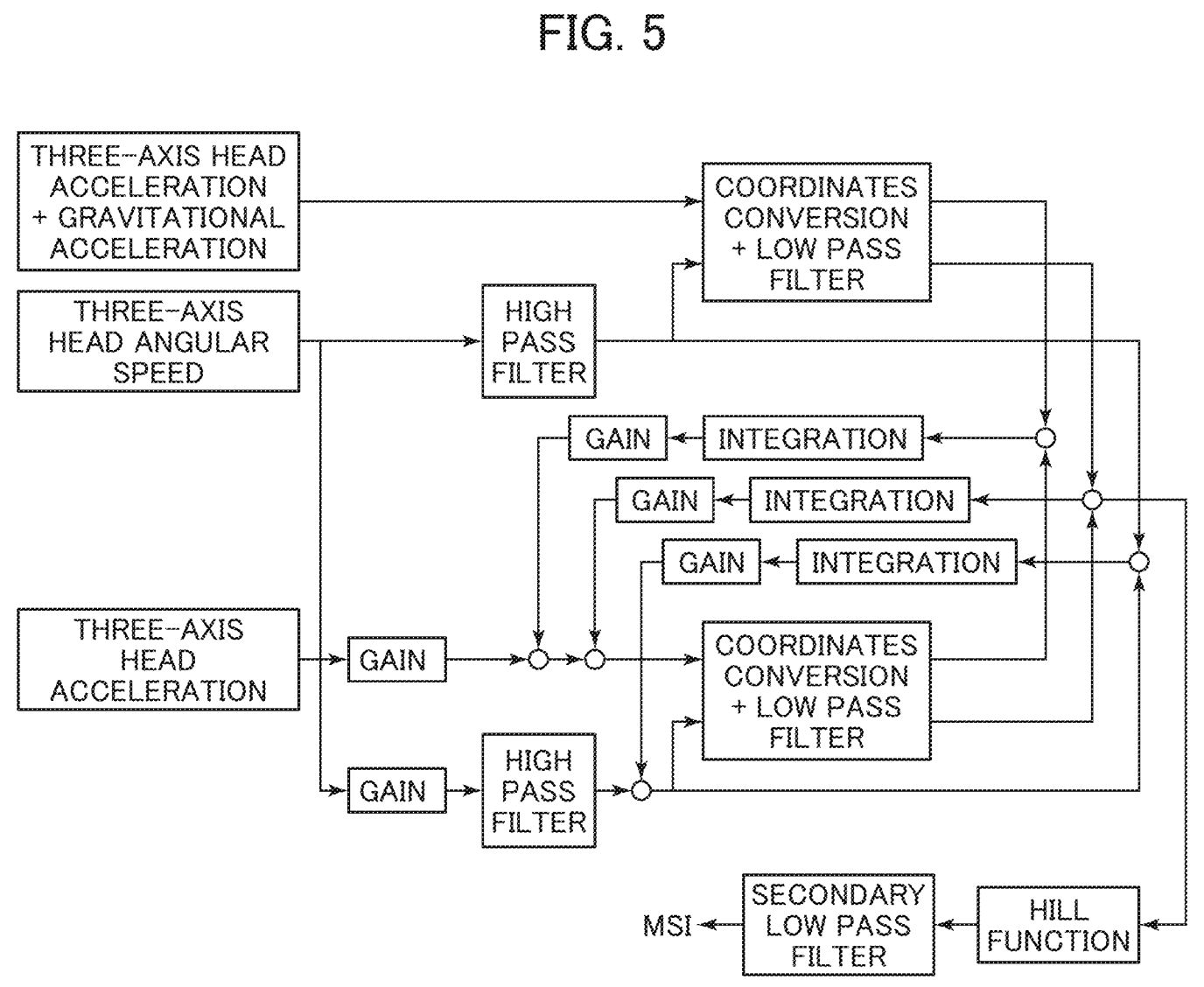

In such processing, with reference to FIG. 5, as one example of motion sickness sensitivity index 26 that evaluates motion sickness sensitivity of the occupant, the motion sickness incidence (MSI) that is an incidence ratio of motion sickness (so-called "car sickness") is described.

The motion sickness incidence (MSI) is calculated by an arithmetic operation method illustrated in FIG. 5, for example. That is, MSI can be calculated based on three-axes head accelerations+gravitational acceleration, three-axes head angular speed and three-axes head acceleration.

In FIG. 5, "head acceleration" and "head angular speed" are acceleration and angular speed that a head of an occupant in a vehicle 1 receives. The motion sickness incidence (MSI) is an index with respect to the vehicle movement where the smaller a value of the motion sickness incidence (MSI), the smaller the rate of the incidence of the motion sickness becomes. Accordingly, it is desirable to generate a target value of the vehicle movement such that the motion sickness incidence (MSI) becomes small.

As another example of the motion sickness sensitivity index 26, a motion sickness dose value (MSDV) is named. This is a value of a specific frequency component that is particularly liable to cause a motion sickness from acceleration generated in a human body. It has been known in general that the higher this value, the more the motion sickness is liable to be caused. Accordingly, in a case that this sensitivity index is focused, a target value of the vehicle movement that controls longitudinal, lateral and vertical accelerations that such a specific frequency component is not generated, is generated.

As still another example of the motion sickness sensitivity index 26, a biological signal (for example, sweating, heartbeats or the like) is named. When the occupant suffers from a motion sickness, it is known that the number of heartbeats is increased or a palm portion or forehead perspires. Accordingly, to focus on this sensitivity index, a target value of vehicle movement is generated so as to improve such a biological signal.

Figure 6:
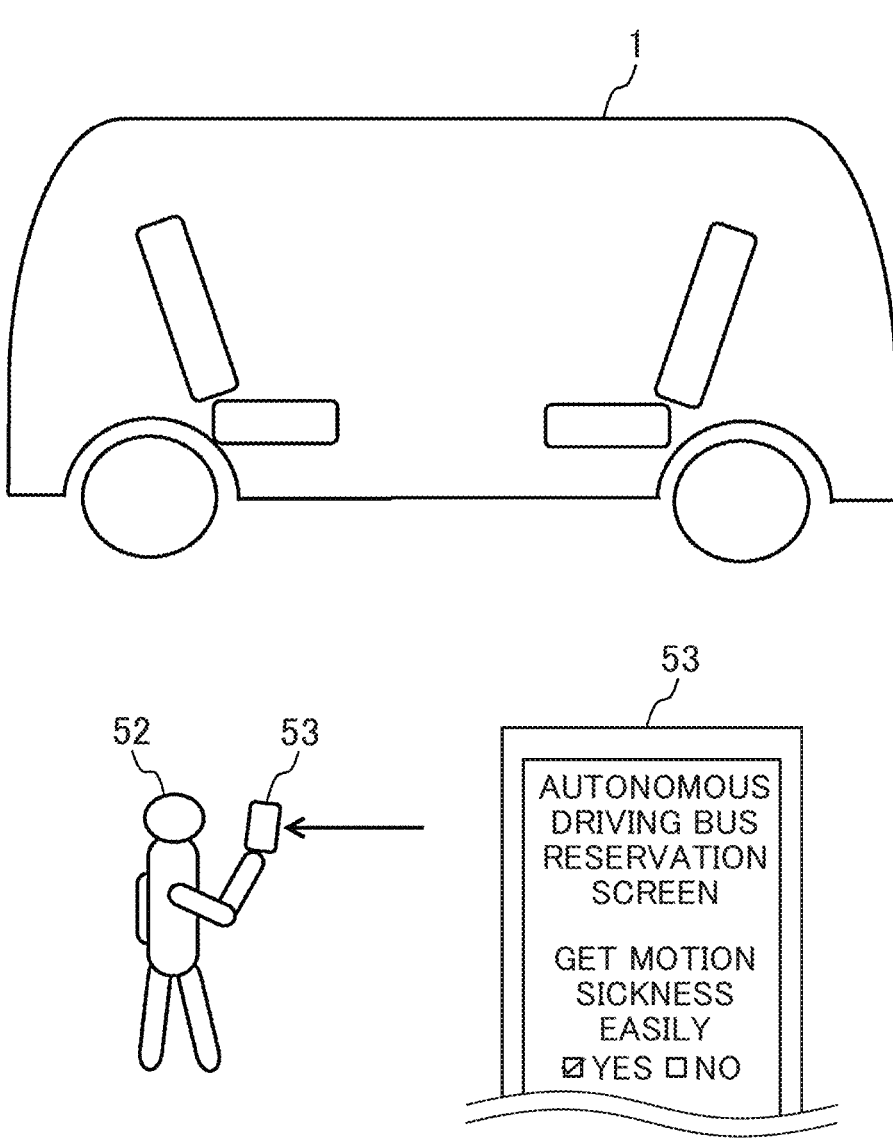
FIG. 6 is a view illustrating one example of the occupant characteristic acquisition unit 23 according to the first embodiment.

As another example of the motion sickness sensitivity index 26, the provision of a means that the occupant inputs liability of a motion sickness is named. FIG. 6 is a view illustrating one example of an inputting means. In FIG. 6, the vehicle 1 has a shape of an autonomically drivable transit bus. A case is estimated where an occupant 52 makes use of the transit bus by reserving riding of the bus in advance using a mobile terminal device 53.

A case is exemplified where the mobile terminal device 53 receives a question "liable to suffer from motion sickness?" on a reservation screen, and allows the occupant to select Yes/No. The occupant characteristic acquisition unit 23 acquires a reply to the question at the time of acquiring reservation information from the mobile terminal device 53 via communication, and motion sickness sensitivity index acquisition unit 25 sets motion sickness sensitivity index 26 based on the reply to the question. For example, when the occupant replied "Yes", the motion sickness sensitivity index of the occupant is set to 1. Accordingly, the target value correction unit 27 described later determines that the occupant is "liable to suffer from motion sickness", and can properly correct the vehicle movement.

As another example of the motion sickness sensitivity index 26, the means that estimates motion sickness sensitivity from the past degree of incidence of motion sickness of the occupant is named. FIG. 7A to FIG. 7D are views illustrating one example of means that estimates motion sickness sensitivity. As illustrated in FIG. 7A, the vehicle 1 has a shape of an autonomically drivable transit bus. In a case where the occupant 52 uses this bus at a previous time, assuming to set the motion sickness sensitivity index as 1.0. During riding on the vehicle 1, the vehicle 1 estimates or measures the motion sickness incidence ratio 61 that expresses the present level of the motion sickness of the occupant 52 by the occupant characteristic acquisition unit 23.

In such an operation, in a case where the target value 22 (for example, the lateral acceleration speed) has elapsed the time as illustrated in FIG. 7B and the motion sickness incidence ratio 61 is increased as illustrated in FIG. 7C at the same point of time and exceeds the threshold 61' so that it is determined that the occupant is in a state where the incidence of the motion sickness is observed, when the occupant 52 rides on the vehicle 1 next time, the motion sickness sensitivity index 26 is changed from 1.0 to 2.0 as illustrated in FIG. 7D. Accordingly, the target value correction unit 27 described later determines that the occupant is "liable to suffer from the motion sickness", and can properly correct the vehicle movement.

The target value correction unit 27 corrects the inputted kind of target value 22, generates the non-inputted kind of target value, and outputs a final target value 28. At this stage of processing, the target value correction unit 27 plays a role of generating a vehicle movement target that takes into account the improvement of riding comfort and the reduction of the motion sickness, and generates the final target value 28 that optimizes the motion sickness sensitivity index 26 acquired by the motion sickness sensitivity index acquisition unit 25.

One example of the operation of the target value correction unit 27 is described with reference to FIG. 8 to FIG. 14. FIG. 8 is a plan view illustrating the vehicle 1 entering a left curve. In the description made hereinafter, the shape of a road is the left curve, and the vehicle 1 enters a road having this left curve shape. A driving operation performed in this situation is left turning.

The road illustrated in FIG. 8 is divided into a first zone (from an entrance to A) having a curvature of 0 (straight line), a second zone (A to B) where a curvature is gradually increased (curvature of monotonous increase: increase of lateral acceleration), a third zone (B to C) where a curvature is constant (steady turning), a fourth zone (C to D) where a curvature is gradually decreased (curvature of monotonous decrease: decrease of lateral acceleration) and a fifth zone (D to an exit) having a curvature of 0 (straight line).

FIG. 9 shows one example of a change with time of the behavior of the vehicle 1 and motion sickness sensitivity index 26 in the left curve illustrated in FIG. 8. In FIG. 9, in order from above, the transitions of a speed 71 of the vehicle 1, the lateral acceleration 72 of the vehicle 1, a rolling angle 73 of the vehicle 1, and a motion sickness sensitivity index 26 are illustrated. A moving distance from the position immediately before the vehicle enters the curve is taken on an axis of abscissas. Chained lines respectively correspond to the positions of the zones A to D illustrated in FIG. 8.

First, a speed 71 starts deceleration from the first zone (the entrance to A) before the vehicle 1 enters the curve, continues the deceleration in the second zone (A to B), and the vehicle 1 travels at a constant speed in the third zone (B to C). Then, when the vehicle 1 enters the fourth zone (C to D), the speed is increased, and even when the vehicle 1 enters the fifth zone (D to the exit), the acceleration continues so that the speed returns to the original speed.

When the vehicle 1 travels with such speed transition, the lateral acceleration 72 generated in the vehicle 1 is increased along with the gradual increase of the curvature in the second zone (A to B), the speed transitions at a constant value in the third zone (B to C) where the curvature is constant (steady turning), and the speed is gradually decreased in the fourth zone (C to D) where the curvature is gradually decreased. The rolling angle 73 also transitions substantially in the same manner as the lateral acceleration 72.

The case where the vehicle 1 moves in the left direction with respect to the advancing direction, that is, when the vehicle 1 turns in the left direction, the lateral acceleration 72 is defined "positive", and the rolling angle 73 that is calculated at this point of time is also defined as "positive" (clockwise direction with respect to the advancing direction). That is, the rolling becomes a rolling toward the outside (right side) direction in turning.

In such vehicle behavior, to indicate one example of the transition of the motion sickness sensitivity index 26, the motion sickness sensitivity index 26 becomes as illustrated in the lowermost stage in FIG. 9. The transition of the motion sickness sensitivity index 26 at the lowermost stage in FIG. 9 is the lapse of time in a case where the motion sickness incidence (MSI) illustrated in FIG. 5 is taken as an example.

When the vehicle 1 enters the left curve, a head of the occupant 52 perceives inertia acceleration in the lateral direction. Further, when the head of the occupant tilts toward the outside of turning due to the inertia, a rolling angle of the head is generated. Because of these two effects, the tendency of increase becomes apparent in the second zone (A to B) and the fourth zone (C to D) where the lateral acceleration 72 and the rolling angle 73 particularly change, and in the zone where the lateral acceleration and the rolling angle become constant, the elevation ratio is gradually lowered. The MSI is also generated due to the longitudinal acceleration and a pitch angle and hence, the MSI already starts the elevation from the first zone (the entrance to A) where the vehicle 1 starts deceleration.

At this point of time, even when the vehicle behaviors (the lateral acceleration, the rolling angle) are the same, depending on an occupant, or depending on a task during driving by the same occupant, tilting of a head differs. As a result, the motion sickness sensitivity index of an occupant a whose head minimally tilts transitions as indicated by 26a, while the motion sickness sensitivity index of an occupant b whose head likeliness to tilt transitions as indicated by 26b. According to the principle of MSI, the latter occupant b is liable to suffer from the motion sickness.

With reference to FIG. 10 and FIG. 11, one example where the target value correction unit 27 changes the final target value 28 is described by taking a riding time of the occupant a whose head minimally tilts and a riding time of the occupant b whose head likeliness to tilt.

FIG. 10 illustrates an example where the speed 71 is changed as the final target value 28. In order from above, the transition of the speed 71 of the vehicle 1, the transition of the lateral acceleration 72, and the transition of the motion sickness sensitivity index 26 are indicated. The moving distance from the position immediately before the vehicle 1 enters the curve is taken on an axis of abscissas. A chained lines respectively correspond to the positions of the zones A to D illustrated in FIG. 8.

The behavior with respect to the occupant a whose head minimally tilts, that is, the behaviors of the speed 71a, the lateral acceleration 72a and the motion sickness sensitivity index 26a are substantially equal to the behaviors illustrated in FIG. 9. On the other hand, when the occupant b whose head has likeliness to tilt passes the left curve at the substantially same speed 71a during riding, the motion sickness sensitivity index becomes 26b that is higher than 26a. Accordingly, the target value correction unit 27 generates the final target value 28 that is lowered as in the case of 71b.

To be more specific, with respect to the occupant b, the longitudinal acceleration (not illustrated in the drawing) that starts deceleration performed at the more frontal position compared to the occupant a is generated as the final target value 28. Accordingly, the lateral acceleration during passing the curve is lowered as indicated by 72b and hence, the motion sickness sensitivity index 26b becomes 26'b that is substantially equal to 26a. That is, the speed at the time of passing the curve is reduced for the occupant b having high motion sickness sensitivity and hence, tilting of the head attributed to the motion sickness can be suppressed whereby the incidence of the motion sickness can be suppressed.

In this embodiment, the behavior example is described by taking the example where MSI is the motion sickness sensitivity index 26. However, the substantially same behavior can be also realized with respect to the motion sickness sensitivity index 26 acquired by a method illustrated in FIG. 6 and FIG. 7A to FIG. 7D. That is, also in a case where the motion sickness sensitivity index of the occupant a is set to 1.0 and the motion sickness sensitivity index of the occupant b is set to 2.0, the final target value 28 substantially equal to the final target value 28 illustrated in FIG. 10 can be generated.

Further, in FIG. 10, the example is illustrated where the final target value 28 is generated such that the motion sickness sensitivity index 26b becomes 26'b substantially equal to 26a. However, the final target value 28 may be generated such that an absolute value or a change rate of the motion sickness sensitivity index 26 falls within a predetermined range. Also in the description made hereinafter, the example is described where the final target value 28 is generated such that 26b becomes 26'b that is substantially equal to 26a using MSI as the motion sickness sensitivity index 26. However, the behavior can be changed in the same manner as described above.

Further, in a case where a plurality of occupants are in the vehicle 1 as illustrated in FIG. 4A, the occupant who has the highest motion sickness sensitivity index 26 is selected, and the final target value 28 is generated such that the motion sickness sensitivity index 26 for the occupant can be suppressed.

FIG. 11 illustrates an example where a rolling angle 73 of the vehicle 1 is changed without changing the speed 71 as the final target value 28. In order from above, the transition of the speed 71 of the vehicle 1, the transition of the rolling angle 73 and the transition of the motion sickness sensitivity index 26 are indicated. The moving distance from the position immediately before the vehicle 1 enters the curve is taken on axis of abscissas. Chained lines respectively correspond to the positions of the zones A to D illustrated in FIG. 8.

The behaviors with respect to the occupant a whose head minimally tilts, that is, the behaviors of the speed 71*a*, the rolling angle 73*a*, the motion sickness sensitivity index 26*a* with respect to the occupant a whose head minimally tilts is substantially equal to the corresponding behaviors illustrated in FIG. 9. On the other hand, the occupant b whose head has likeliness to tilt passes the left curve at the substantially same speed 71*a* during riding, the motion sickness sensitivity index becomes 26*b* that is a value higher than 26*a*. Accordingly, the target value correction unit 27 generates the final target value 28 where the vehicle is tilted toward the inner side of turning such that the rolling angle becomes 73*b*. As a result, the lateral acceleration generated by inertia that the head of the occupant b perceives during passing the curve is reduced, and the motion sickness sensitivity index 26*b* becomes 26'*b* that is substantially equal to 26*a*.

As described previously, not only the generation of the lateral acceleration and the rolling angle at the time of entering the curved road but also the longitudinal acceleration and the pitching angle at the time of acceleration and deceleration also become factors that cause the motion sickness. Accordingly, depending on an occupant, the careless deceleration in front of the curved road has a possibility of causing a motion sickness to the contrary and hence, a situation may arise that a target value other than a speed is to be changed at the time of passing the curved road. With a method illustrated in FIG. 11, a motion sickness caused by both the longitudinal vehicle movement and the lateral vehicle movement can be properly suppressed by using an index referred to as MSI.

In this embodiment, one example of a method of changing a rolling angle by the motor 12 is described with reference to FIG. 12. In a case where a rolling angle is generated toward the inside of the turning (in the left direction toward the advancing direction) as illustrated in FIG. 11, first, a drive force in the positive direction is generated in the left front wheel 11$_{FL}$ and the right rear wheel 11$_{RR}$ using the motors 12 as illustrated in the left view in FIG. 12, and a drive force in the negative direction is generated in the right front wheel 11$_{FR}$ and the left rear wheel 11$_{RL}$.

As a result, in the vehicle 1, a suspension force directed in the DOWN direction on a left side and in the UP direction on a right side is generated as illustrated in the right view in FIG. 12, the vehicle 1 is tilted in the left direction by these suspension forces, and a posture control of the vehicle 1 that conforms to the final target value 28 generated as an internal command is realized. Alternatively, as an actuator is mounted on the suspension 15, and a suspension force may be directory generated.

With respect to FIG. 13 and FIG. 14, in the same vehicle movement (speed, lateral acceleration), a mechanism where the motion sickness sensitivity index 26 differs for every occupant, and a mechanism where a rolling angle in the direction toward the inside of the turning reduces the motion sickness sensitivity index 26 are described.

FIG. 13 illustrates the transition of the lateral acceleration 72 of the vehicle 1, the transition of the head rolling angle 74 of an occupant 52 and the transition of the motion sickness sensitivity index 26 are illustrated in order from above with respect to the occupants a, b, respectively. Further, on a lower stage in FIG. 13, the behaviors of the lateral acceleration speed 72 and a rolling angle 73 of the vehicle 1, and the head rolling angles 74*a*, 74*b* of the respective occupant a, b in the third zone (B to C) are schematically illustrated.

FIG. 14 illustrates, in the same manner as FIG. 11, the behaviors in a case where the rolling angle is changed in the direction toward the inside of the turning with respect to the occupant b whose head has likeliness to tilt, that is, the rolling angle 73 of the vehicle 1 (illustrated again in addition to the illustration in FIG. 11) and the head rolling angle 74 of the occupant and the motion sickness sensitivity index 26 of the occupant (illustrated again in addition to the illustration in FIG. 11) in order from above. A moving distance from the position immediately before the vehicle 1 enters the curve is taken on an axis of abscissas. Chained lines respectively correspond to the zones A to D illustrated in FIG. 8.

First, in the example illustrated in FIG. 13, both the occupant a whose head minimally tilts and the occupant b whose head has likeliness to tilt pass the curve at the same speed and hence, the lateral accelerations generated during such passing are the same as indicated by 72*a*, 72*b*. On the other hand, with respect to a head rolling angle 74 of an occupant, it has been known in general that tilting of the head differs depending on an occupant with respect to the same lateral acceleration. In FIG. 13, the head rolling angle 74*b* of the occupant b is larger than the head rolling angle 74*a* of the occupant a in the positive direction.

At this point of time, as illustrated in schematic views on a lower stage in FIG. 13, with respect to the vehicle 1, along with the generation of the lateral acceleration 72, the rolling angle 73 is generated on an opposite side due to the law of inertia. Further, to the head of the occupant 52, in addition to the rolling angle 73 of the vehicle 1, the inertial acceleration in the lateral direction is applied and hence, a rolling angle that is equal to or more than the rolling angle 73 of the vehicle 1 is generated. In this case, the tilting of the head of the occupant b becomes larger than the tilting of the head of the occupant a.

It is considered that this difference in tilting of the head is brought about by a factor that whether or not an occupant wants to suppress the tilting of the head generated by the inertial acceleration by his/her will differs depending on the occupant, and a factor that whether or not the occupant can predict the generation of inertial acceleration applied to the vehicle 1 differs depending on the experience of the occupant or the task of the occupant during riding. Based on the principle of the MSI, the larger the head rolling angle 74 toward the outside of the turning with respect to the same lateral acceleration, the larger the MSI becomes. In FIG. 13, such increase of the MSI causes the motion sickness sensitivity index 26*b* larger than the motion sickness sensitivity index 26*a*. That is, it is suggested that the likeliness of the occupant b to suffer from the motion sickness is larger than the occupant a.

Accordingly, for the occupant b whose head is liable to tilt, the suppression of the head movement by changing the target value of the vehicle movement leads to the reduction of the motion sickness.

In FIG. 14, in the same manner as FIG. 11, the occupant b whose head has likeliness to tilt compared to the occupant a whose head minimally tilts changes the rolling angle toward the inside of the turning as indicated by 73 and determines the final target value 28.

As a result, the head rolling angle 74*b* of the occupant b becomes 74'*b* compared to 74*b* before the rolling angle of the vehicle 1 is changed, and becomes substantially equal to the rolling angle of the occupant a. Accordingly, the motion sickness sensitivity index of the occupant b also becomes 26'*b* from 26*b*, becomes substantially equal to the motion sickness sensitivity of the occupant a.

As has been described, the target correction unit 27 generates the final target value 28 by correcting the target value 22 based on the motion sickness sensitivity index 26 with respect to the occupant 52 or a numerical value of the motion sickness sensitivity index 26 or an elevation ratio falls within a predetermined value. In other words, it is also safe to say that the target value 22 is corrected such that the tilting of the head (for example, the head rolling angle) of the occupant falls within a predetermined value.

As has been described, according to the vehicle integrated control device 2 of the present embodiment, it is possible to provide the vehicle integrated control device that generates the target value of the vehicle movement that effectively reduce the motion sickness depending on the individual difference relating to the motion sickness sensitivity of the occupant.

Second Embodiment

A vehicle integrated control device and a vehicle integrated control method according to a second embodiment of the present invention are described with reference to FIG. 15 to FIG. 18.

In the first embodiment, the configuration is described where the vehicle integrated control device includes a means for acquiring (measuring) the occupant characteristic 24, and the final target value 28 is generated by calculating the motion sickness sensitivity index 26 based on the occupant characteristic 24. In such a configuration, as one example of the occupant characteristic 24, the tilting of the head is named, and a change in the final target vale 28 is indicated by taking MSI that is calculated based on the tilting of the head as an example.

On the other hand, to take into account the more effective reduction of the motion sickness of an occupant, it is desirable to predict in advance how the head movement of the occupant is generated from the vehicle movement, and to change the vehicle movement. For realizing such a desire, the configuration may be adopted where a movement model relating to the head movement of the occupant is incorporated in the vehicle integrated control device 2, and parameters of the movement model are properly adjusted corresponding to the characteristic of tilting of the head of the occupant.

FIG. 15 is a functional block diagram of the vehicle integrated control device 2 according to the second embodiment.

As illustrated in FIG. 15, the vehicle integrated control device 2 according to the present embodiment includes, at least, a target value generation unit 21, a vehicle movement acquisition unit 81, a head movement acquisition unit 82, an individual difference learning unit 83, an individual difference storage unit 84, a motion sickness sensitivity index acquisition unit 25, and a target value correction unit 27. The target value generation unit 21, the motion sickness sensitivity index acquisition unit 25, the target value correction unit 27 are substantially equal to the corresponding units in the first embodiment and hence, the description of these units is omitted.

The vehicle movement acquisition unit 81 acquires the vehicle movement of six axes at maximum (the respective longitudinal, lateral and vertical accelerations, and the respective detection values of a rolling rate, a pitching rate, and a yaw rate) from a combine sensor 4. The combine sensor 4 mounted on a vehicle 1 in general acquires, in general, three axes in total consisting of the longitudinal acceleration, the lateral acceleration, and the yaw rate. In this case, by acquiring a steering angle from these three-axes vehicle movement, a speed 71 and steering mechanism 14, rates or angles of rolling and pitching are estimated.

The head movement acquisition unit 82 acquires a momentum of six axes at maximum with respect to the head of the occupant 52 riding on the vehicle 1. In this case, particularly, the acquisition of at least one out of the rolling angle and the pitching angle of the head becomes necessary. To describe one example of the acquisition method, for example, as described in FIG. 4A and FIG. 4B, an image of a head of the occupant 52 is imaged from an image of a camera mounted in a cabin, and a rolling angle and a pitching angle are recognized from the image.

In a case where the occupant 52 positively moves the head, the head movement acquisition unit 82 extracts the head movement attributed to the vehicle movement by excluding the momentum.

The individual difference learning unit 83 identifies (decides) head movement model parameters of the occupant based on the acquired vehicle movement and the acquired head movement of the occupant.

One example of the manner of operation of the individual difference learning unit 83 is described with reference to FIG. 16A to FIG. 17.

FIG. 16A illustrates a manner that a head rolling angle 74 is generated due to lateral acceleration 72 applied to the occupant 52. FIG. 16B illustrates an example of a case where a dynamic model in general consisting of a spring, a mass and a damper is adopted as a head movement model. Although the description is made in FIG. 16A and FIG. 16B by taking the rolling direction as an example, the head movement model in the pitching direction also can be expressed by the substantially same model.

First, as illustrated in FIG. 16A, when the lateral acceleration 72 is applied to the occupant 52, inertial acceleration is generated in the head and hence, the rolling angle 74 of the head is generated. At this point of time, in general, it has been known that a neck (a connecting portion between a shoulder and the head) of the occupant 52 has characteristics of a spring (generating a reaction force proportional to displacement) and a damper (generating a reaction force proportional to a change in displacement with the lapse of time). To simplify such a configuration as a head movement model, as illustrated in FIG. 16B, the head movement model is expressed as the configuration where an inertia 93 is connected to a ground by way of a spring 91 and a damper 92.

The dynamic inputting into this model is inertial acceleration generated on the point of gravity of the inertia 93, and the displacement 94 generated as the result is equivalent to the head rolling angle 74. By estimating such a model, a change in the head rolling angle 74 of the occupant with the laps of time attributed to a change in lateral acceleration with lapse of time set at the target value 22 can be estimated.

It is considered that coefficients of the spring 91 and the damper 92 illustrated in FIG. 16B differ depending on a person (individual difference existing), and the individual deference learning unit 83 identifies the coefficients of these spring 91 and damper 92. In general, the larger the coefficients of the spring and the damper, the smaller the tilting of the head becomes.

An example of identifying the coefficients of the spring 91 and the damper 92 is described with reference to FIG. 17. In FIG. 17, a case is estimated where the vehicle 1 changes a lane from the left to the right on a road having two lanes. The lateral acceleration 72 is generated as illustrated in the drawing. That is, first, the negative lateral acceleration is generated by steering the vehicle 1 in the right direction, and next, the positive acceleration is generated by steering the vehicle 1 in the left direction. At this point of time, a head rolling angle relative to the same lateral acceleration 72 differs as indicated by 74a, 74b between an occupant a whose head minimally tilts and an occupant b whose head has likeliness to tilt.

The individual difference learning unit 83 identifies the coefficients of the spring 91, the damper 92 based on the time-sequential relationship between the lateral acceleration 72 and the head rolling angle 74. For example, in FIG. 17, an amplitude of the head rolling angle 74b is substantially twice as large as the amplitude of the head rolling angle 74a and hence, with respect to the identified spring coefficients, it is estimated that the spring coefficient relating to the occupant b is substantially half of the spring coefficient relating to the occupant a.

The individual difference storage unit 84 stores the head movement model, and the spring coefficient value and the damper coefficient values of the occupant identified by the individual difference learning unit 83 that are described above.

The motion sickness sensitivity index acquisition unit 25 calculates the head movement (rolling angle, pitching angle and the like) of the occupant based on the head movement model and the spring coefficient, the damper coefficient, and the value of the lateral acceleration 72 set within the target value 22 stored in the individual difference storage unit 84. Then, the motion sickness sensitivity index acquisition unit 25 calculates the motion sickness sensitivity index 26 based on the calculated head movement of the occupant. The calculation example of the motion sickness sensitivity index 26 is substantially equal to the calculation example of the motion sickness sensitivity index 26 in the first embodiment and hence, the description of the calculation example is omitted.

FIG. 18 is a flowchart illustrating the processing of the vehicle integrated control device 2 according to the present embodiment. In this processing, in every calculation step, it is determined whether or not the identification of the head movement model is completed with respect to the occupant 52 riding in the vehicle 1. In a case the identification has not been completed, the motion sickness sensitivity index 26 is calculated using a general coefficient while performing identification processing, and the motion sickness sensitivity index 26 is calculated with the identified coefficient when the identification has been completed.

First, in step S101, the head movement acquisition unit 82 identifies the occupant 52 as an individual. For example, the head movement acquisition unit 82 determines whether or not the occupant 52 has ridden on the vehicle 1 in the past based on camera images.

Next, in step S102, the individual difference learning unit 83 determines whether or not learning of the head movement model has been finished relating to the occupant 52. That is, the individual difference learning unit 83 determines whether or not a spring coefficient and a damper coefficient of the occupant 52 are stored in the individual difference storage unit 84.

In a case where learning of the head movement model of the occupant 52 has not been finished (No), in step S103, the vehicle movement acquisition unit 81 acquires the vehicle movement. Further, in step S104, the head movement acquisition unit 82 acquires the head movement of the occupant 52. Then, in step S105, the individual difference learning unit 83 identifies the parameter of the head movement model of the occupant 52 based on the acquired vehicle movement and the head movement of the occupant 52. Then, in step S106, individual difference learning unit 83 determines whether or not the identification has been completed. In this step, the identification requires time-sequential information of the vehicle movement and the head movement of the occupant 52 amounting to a predetermined time. Accordingly, whether or not the predetermined time has elapsed from starting learning becomes a main determination reference.

In a case where it is determined that the identification has not been completed in step S106 (No), in step S107, motion sickness sensitivity index acquisition unit 25 calculates the head movement of the occupant 52 using a spring coefficient and a damper coefficient of a human body in general.

On the other hand, in a case where the head movement model of the occupant 52 has been already learned in step S102 (Yes), or it is determined that the identification has been completed in step S106 (Yes), in step S108, the head movement of the occupant 52 is calculated using the identified spring coefficient and damper coefficient.

Then, in step S109, the motion sickness sensitivity index 26 is calculated based on the calculated head movement of the occupant 52.

Lastly, in step S110, the target value correction unit 27 calculates the final target value 28 based on the calculated motion sickness sensitivity index 26.

As has been described heretofore, according to the vehicle integrated control device 2 of this embodiment, the way how the head movement of the occupant 52 is generated from the vehicle movement in advance, is measured including the individual differences, and the vehicle movement is changed and hence, it is possible to reduce the motion sickness of the occupant 52 more effectively.

Third Embodiment

A vehicle integrated control device and a vehicle integrated control method according to a third embodiment of the present invention are described with reference to FIG. 19 to FIG. 21.

The first embodiment and the second embodiment adopt the configuration where the vehicle integrated control device 2 outputs the final target value 28, and decides manipulated valuables of the respective actuators 12 to 15 or low-end controllers based on the final target value 28. However, the configuration that decides manipulated valuables of the respective actuators may be incorporated in the vehicle integrated control device 2.

FIG. 19 is a functional block diagram of the vehicle integrated control device 2 according to the third embodiment.

The vehicle integrated control device 2 according to this embodiment includes: as illustrated in FIG. 19, at least, a target value generation unit 21, an occupant characteristic acquisition unit 23, a motion sickness sensitivity index acquisition unit 25, a target value correction unit 27, and a manipulated valuable allocation unit 85. The target value generation unit 21, the occupant characteristic acquisition unit 23, the motion sickness sensitivity index acquisition unit 25, and the target value correction unit 27 are substantially equal to the corresponding unit in the first embodiment, and hence, the description of these units is omitted.

The manipulated valuable allocation unit 85 properly distributes manipulated valuables of respective actuators such as a motor 12, a braking mechanism 13, a steering mechanism 14 and a suspension 15 based on the final target value 28 generated by the target value correction unit 27.

This manipulated valuable allocation unit 85 exists in the vehicle integrated control device 2 and hence, the vehicle integrated control device 2 can realize functions such as the suppression of power consumption of the actuators while satisfying a command of the final target value 28 thus satisfying different needs corresponding to a characteristic of the occupant 52.

One example of a control performed by the vehicle integrated control device 2 according to this embodiment illustrated in FIG. 19 is described with reference to FIG. 20 and FIG. 21.

Both FIG. 20 and FIG. 21 illustrate operational examples of the respective actuators when an occupant a having low motion sickness sensitivity (the head minimally tilting) and an occupant b having high motion sickness sensitivity (the head having likeliness to tilt) ride on a vehicle by taking the case where the vehicle travels on the left curve illustrated in FIG. 8 in the same manner as the first embodiment.

In FIG. 20 and in FIG. 21, controlling of a rolling angle 73 of the vehicle 1 is focused, and as actuators, particularly, the motor 12, and the suspension 15 are focused. That is, with respect to the braking mechanism 13 and the steering mechanism 14, the description of these mechanisms is omitted by assuming that the operations of these mechanisms are same between the occupant a and the occupant b.

FIG. 20 illustrates, in a descending order from above, the transition of a speed 71 of the vehicle 1, the transition of a rolling angle 73, the transition of a motor torque 76a that is a torque of the motor 12 when the occupant a rides on the vehicle 1, and the transition of the motor torque 76b when the occupant b rides on the vehicle 1. Further, FIG. 21 illustrates, in the descending order from above, a suspension force 77a when the occupant a rides on the vehicle 1 that is a propulsive force of an actuator mounted on the suspension 15, a suspension force 77b when the occupant b rides on the vehicle 1, the transition of the total power consumption 78 of the vehicle 1 when the vehicle travels in the zone, and the transition of motion sickness sensitivity index 26 of the occupant. In all these transitions, a moving distance from the position immediately before the vehicle 1 enters the curve is taken on an axis of abscissas. Chained lines respectively correspond to the positions of the zones A to D illustrated in FIG. 8.

With respect to the suspension force 77, assume a propulsive force in the direction that a vehicle is lifted is the positive direction.

First, the speed 71 in FIG. 20 is focused. In this case, in the same manner as FIG. 10, an example is illustrated where a speed of an occupant b whose head has likeliness to tilt is low compared to a speed of an occupant a whose head minimally tilts. That is, a speed 71b starts deceleration immediately in front of the curve compared to a speed 71a. Unlike FIG. 10, in FIG. 20, the case is illustrated where the deceleration is completed before the vehicle reaches a point A, and travels at a constant speed in the zones A to D.

Next, to focus on the rolling angle 73, in a case where the vehicle 1 passes the main curve at a speed 71a without a control in the rolling direction, the rolling angle is generated as indicated by 73'. On the other hand, in FIG. 20, the rolling angle is controlled so as to aim at a larger motion sickness reducing effect for the occupant b so that a rolling angle 73b is formed of a rolling angle that is positively inclined toward the inside in turning. Further, the rolling angle 73a of the occupant a is also controlled such that the increase of the rolling angle is suppressed compared to 73' in a case where a control in the rolling direction is not performed at all.

To realize such a change in the rolling angle, the motor 12 and the suspension 15 are respectively controlled as described below.

First, to focus on the motor torque 76 illustrated in FIG. 20, with respect to the motor torque 76a for the occupant a, the same amount of motor torque is generated in the minus direction in all four wheels for decelerating the vehicle in front of the point A. Then, at the time of passing the curved road ranging from the zones A to D, the motor torque $76a_{FL}$ of the left front wheel and the motor torque $76a_{RR}$ of the right rear wheel are generated in the positive direction, and the motor torque $76a_{FR}$ of the right front wheel and the motor torque $76a_{RL}$ of the left rear wheel are generated in the negative direction.

Accordingly, as described with reference to FIG. 12, the rolling angle that is tilt toward the inside of the turning (left side in the advancing direction) is generated, and this change in rolling angle is the degree of contribution to an extent that the rolling angle 73' is changed to 73a. Then, when the vehicle is accelerated beyond the point D, the same amount of motor torque 76a is generated in the positive direction in all four wheels.

On the other hand, the motor torque 76b for the occupant b is substantially the same as the motor torque 76a for the occupant a with respect to a point that the same amount of motor torque 76b is generated in the negative direction in all four wheels for performing deceleration in front of the point A. However, the deceleration start point is in front of the deceleration start point in the case of the occupant a so that the deceleration period becomes longer. Then, during a period that the vehicle passes the curve path ranging from the zone A to the zone D, the motor torque substantially equal to the motor torque for the occupant a is generated. Although the same amount of motor torque is generated in the positive direction in all four wheels after the point D, also in this case, in the same manner as the deceleration start point in front of the point A, the acceleration finish point is behind the point A so that the acceleration period for the occupant b becomes longer than the acceleration period for the occupant a.

Next, to focus on the suspension force 77 in FIG. 21, the suspension force 77a for the occupant a is not particularly generated in any zones and becomes zero. On the other hand, with respect to the suspension force 77b for the occupant b, the suspension forces $77b_{FR}$, $77b_{RR}$ corresponding to two wheels on a right side are generated in the positive direction (the direction that the vehicle body is lifted) ranging from the zone A to the zone D, and the suspension forces $77b_{FL}$, $77b_{RL}$ corresponding to two wheels on a left side are generated in the negative direction (the direction that the vehicle body is sunk). Accordingly, the rolling angle that tilts toward the inside of the turning (the left side in the advancing direction) is generated, and this change in rolling angle is the degree of contribution to an extent that the rolling angle 73a is changed to 73b.

Then, to focus on the power consumption 78 in the operation of the motor 12 and the suspension 15, first, in the first zone (the entrance to A), both power consumptions 78a, 78b become negative. This is because the regenerative braking generated by the motor 12 returns electric power to a battery during a deceleration period, and 78b having a longer deceleration period temporarily exhibits smaller power consumption than 78a (the larger power consumption in the negative direction).

Thereafter, the power consumption is increased in the zones A to D with respect to both the occupant a and the occupant b. This power consumption is the power consumption caused by copper loss and iron loss caused by the generation of the motor torque 76 and the power consumption caused by the suspension force 77. Particularly, the contribution rate of the power consumption due to the suspension force 77*b* with respect to the occupant b is large. As a result, the power consumption of 78*b* in the zone is rapidly increased and exceeds 78*a*.

Lastly, in the fifth zone (D to the exit), the power consumption is increased due to the acceleration caused by the motor torque 76, and in this zone, the increase of the power consumption of 78*b* having the long acceleration period is large. From the above, the power consumption of 78*b* in total becomes eventually larger than 78*a*.

Due to the speed 71 and the rolling angle 73 brought about by the operation of the actuators described above, the motion sickness sensitivity index 26*b* of the occupant b has become substantially equal to the motion sickness sensitivity index 26*a* of the occupant a. That is, with respect to the occupant b having high sensitivity to the motion sickness, it is possible to realize the vehicle movement where the occupant b minimally suffers from the motion sickness substantially in the same manner as the occupant a.

On the other hand, with respect to the occupant a, a lowering width of the speed 71*a* is small and the power consumption 78*a* is small, this embodiment provides advantageous effects such as the convenience that an arrival time to the destination is short and the high traveling efficiency (a low traveling cost).

That is, this embodiment provides a high motion sickness suppression effect to the occupant having high sensitivity to the motion sickness and provides other advantageous effects such as the convenience and the suppression of cost to the occupant having low sensitivity to the motion sickness.

As has been described above, according to the vehicle integrated control device 2 of this embodiment, by incorporating the manipulated variable allocation unit that decides the manipulated variables of the respective actuators in the vehicle integrated control device 2, the vehicle integrated control device 2 can cope with the motion sickness sensitivity and the riding needs that differ depending on the occupants.

The present invention is not limited to the above-mentioned embodiments, and includes various modifications. For example, the above-mentioned embodiment is described in detail so as to facilitate the understanding of the present invention, and it is not always the case that the vehicle integrated control device includes all configurations described above. Further, some parts of the configuration of one embodiment can be replaced with the configuration in other embodiments. Further, the configuration in other embodiments may be added to the configuration of one embodiment. Still further, with respect to some part of the configuration of each embodiment, the addition, the deletion and the replacement of other configuration are conceivable.

LIST OF REFERENCE SIGNS

1*a*, 1*b*, 1*c*: vehicle
11: wheel
12: motor
13: braking mechanism
13*a*: wheel cylinder
13*b*: braking control device
14: steering mechanism
14*a*: steering control device
14*b*: steering motor
15: suspension 16: acceleration pedal
16*a*: stroke sensor
16*b*: acceleration control device
17: braking pedal
18: steering wheel
18*a*: steering torque detection device
18*b*: steering angle detection device
19: outside world sensor
2: vehicle integrated control device
21: target value generation unit
22: target value
23, 23*a*, 23*b*: occupant characteristic acquisition unit
24: occupant characteristic
25: motion sickness sensitivity index acquisition unit
26, 26*a*, 26*b*, 26'*b*: motion sickness sensitivity index
27: target value correction unit
28: final target value
. . . : external control device
. . . : combine sensor
5: occupant characteristic
52, 52*a*, 52'*a*, 52*b*: occupant
53: mobile terminal device
61: motion sickness incidence rate
61': threshold of motion sickness incidence rate
71, 71*a*, 71*b*: speed
72: lateral acceleration
73, 73*a*, 73*b*, 73': rolling angle
74, 74*a*, 74*b*, 74'*b*: head rolling angle of occupant
75: traveling trajectory
76, 76*a*, 76*b*: motor torque
77, 77*a*, 77*b*: suspension force
78, 78*a*, 78*b*: power consumption
81: vehicle movement acquisition unit
82: head movement acquisition unit
83: individual difference learning unit
84: individual difference storage unit
85: manipulated variable allocation unit
91: spring of head movement model
92: damper of head movement model
93: inertia of head movement model
94: displacement of inertia of head movement model

The invention claimed is:

1. A vehicle integrated control device comprising a processor configured to:
   generate or acquire a control target value of a movement of a vehicle, a present vehicle movement of the vehicle, and a first head movement of an occupant of the vehicle;
   acquire a feature of the first head movement that differs depending on an occupant characteristic of the occupant from the present vehicle movement and the first head movement;
   predict a second head movement of the occupant attributed to the control target value based on the acquired feature of the first head movement;
   acquire a motion sickness sensitivity index that is a quantitative value indicating a likelihood of incidence of motion sickness that differs depending on the occupant characteristic of the occupant, wherein the likelihood is predicted based on the present vehicle movement and the second head movement; and
   correct the control target value based on the control target value and the motion sickness sensitivity index.

2. The vehicle integrated control device according to claim 1, wherein the processor is further configured to:
   acquire, as the occupant characteristic, at least one of a vehicle riding position of the occupant, a riding direction, line-of-sight information, posture of a head, a motion sickness incidence rate, or a past motion sickness incidence history.

3. The vehicle integrated control device according to claim 1, wherein the processor is further configured to:
   receive an input of the motion sickness sensitivity index to acquire the likelihood of incidence of motion sickness.

4. The vehicle integrated control device according to claim 1, wherein the processor is further configured to:
   predict, as the motion sickness sensitivity index, the likelihood of incidence based on a past degree of incidence of motion sickness of the occupant.

5. The vehicle integrated control device according to claim 1, wherein the processor is further configured to:
   correct the control target value such that the larger the motion sickness sensitivity index, the larger a correction width of the control target value becomes.

6. The vehicle integrated control device according to claim 1, wherein the processor is further configured to:
   correct the control target value such that the motion sickness sensitivity index falls within a predetermined value.

7. The vehicle integrated control device according to claim 1, wherein the processor is further configured to:
   correct the control target value such that the larger a change in a posture of the head of the occupant with respect to the control target value, the larger a correction width of the control target value becomes.

8. The vehicle integrated control device according to claim 1, wherein the processor is further configured to:
   correct the control target value such that a change in a posture of the head of the occupant with respect to the control target value falls within a predetermined value.

9. The vehicle integrated control device according to claim 1, wherein the processor is further configured to:
   determine manipulated variables of a plurality of actuators mounted on the vehicle such that a controlled value approaches the control target value.

10. The vehicle integrated control device according to claim 9, wherein the processor is further configured to:
   correct the control target value such that the larger the motion sickness sensitivity index, the larger the manipulated variables of the actuators become.

11. A vehicle integrated control method comprising:
   generating or acquiring a control target value of a movement of a vehicle, a present vehicle movement of the vehicle, and a first head movement of an occupant of the vehicle;
   acquiring a feature of the first head movement that differs depending on an occupant characteristic of the occupant from the present vehicle movement and the first head movement;
   predicting a second head movement of the occupant attributed to the control target value based on the acquired feature of the first head movement;
   acquiring a motion sickness sensitivity index that is a quantitative value indicating a likelihood of incidence of motion sickness that differs depending on the occupant characteristic of the occupant, wherein the likelihood is predicted based on the present vehicle movement and the second head movement; and
   correcting the control target value based on the control target value and the motion sickness sensitivity index.

12. The vehicle integrated control method according to claim 11, further comprising:
   acquiring, as the occupant characteristic, at least one of a vehicle riding position, a riding direction, line-of-sight information, posture of a head, a motion sickness incidence, or a past motion sickness incidence history of the occupant.

13. The vehicle integrated control method according to claim 11, further comprising:
   receiving an input of the motion sickness sensitivity index to acquire the likelihood of incidence of motion sickness.

* * * * *